United States Patent
Aravind et al.

(10) Patent No.: US 11,381,955 B2
(45) Date of Patent: Jul. 5, 2022

(54) METHODS, SYSTEMS, AND COMPUTER READABLE MEDIA FOR MONITORING MACHINE TYPE COMMUNICATIONS (MTC) DEVICE RELATED INFORMATION

(71) Applicant: Oracle International Corporation, Redwood Shores, CA (US)

(72) Inventors: Srividya Aravind, Bangalore (IN); Shashikiran Bhalachandra Mahalank, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/932,226

(22) Filed: Jul. 17, 2020

(65) Prior Publication Data

US 2022/0022024 A1 Jan. 20, 2022

(51) Int. Cl.
*H04W 8/04* (2009.01)
*H04W 40/24* (2009.01)
(Continued)

(52) U.S. Cl.
CPC .............. *H04W 8/04* (2013.01); *H04L 67/02* (2013.01); *H04W 4/70* (2018.02); *H04W 40/24* (2013.01)

(58) Field of Classification Search
CPC ......... H04W 8/04; H04W 40/24; H04W 4/70; H04L 67/02
(Continued)

(56) References Cited

U.S. PATENT DOCUMENTS 6,119,000 A 9/2000 Stephenson et al.
7,535,915 B2 5/2009 Collins
(Continued)

FOREIGN PATENT DOCUMENTS

CN 103298110 A 9/2013
CN 106664516 A 5/2017
(Continued)

OTHER PUBLICATIONS

Enhanced 3GPP system for Machine Type Communications and Internet of Things; IEEE Explore; by Andreas Kunz et al. (Year: 2015).*

(Continued)

*Primary Examiner* — Hirdepal Singh
(74) *Attorney, Agent, or Firm* — Jenkins, Wilson, Taylor & Hunt, P.A.

(57) ABSTRACT

The subject matter described herein includes methods, systems, and computer readable media for monitoring machine type communications (MTC) device related information. One method occurring at an service capability exposure function (SCEF) node includes receiving a monitoring configuration request associated with an MTC device; sending, to a home subscriber server (HSS), a send routing information (SRI) request for requesting a serving network node associated with the MTC device; receiving, from the HSS, an SRI response indicating the serving network node associated with the MTC device; sending, to the serving network node, an insert subscriber data (ISD) request for requesting device related information; and receiving, from the serving network node, an ISD response including the device related information.

18 Claims, 8 Drawing Sheets

(51) Int. Cl.
*H04L 67/02* (2022.01)
*H04W 4/70* (2018.01)

(58) Field of Classification Search
USPC .................................................... 455/432.1
See application file for complete search history.

(56) References Cited

U.S. PATENT DOCUMENTS

| | | | |
|---|---|---|---|
| 9,025,445 B2 | 5/2015 | Jain et al. | |
| 9,432,150 B2 | 8/2016 | Jain et al. | |
| 9,467,508 B2 | 10/2016 | Xu | |
| 9,621,450 B2 | 4/2017 | Jeong et al. | |
| 9,730,156 B1 | 8/2017 | Chamarty et al. | |
| 9,781,259 B1 | 10/2017 | Kodaypak | |
| 9,893,939 B2 | 2/2018 | Kim et al. | |
| 9,894,464 B2 | 2/2018 | Jain et al. | |
| 9,948,646 B1 | 4/2018 | Lai et al. | |
| 10,104,567 B2 | 10/2018 | Kodaypak | |
| 10,129,867 B2 | 11/2018 | Shaw et al. | |
| 10,194,459 B2 | 1/2019 | Kim et al. | |
| 10,212,639 B2 | 2/2019 | Kodaypak | |
| 10,231,113 B1 | 3/2019 | Huang et al. | |
| 10,313,883 B2 | 6/2019 | Krishan | |
| 10,313,914 B2 | 6/2019 | Huang et al. | |
| 10,334,419 B2 | 6/2019 | Aravamudhan et al. | |
| 10,375,530 B2 | 8/2019 | Buckley et al. | |
| 10,375,548 B2 | 8/2019 | Kodaypak et al. | |
| 10,405,158 B2 | 9/2019 | McCann | |
| 10,448,243 B2 | 10/2019 | Tanna | |
| 10,448,449 B2 | 10/2019 | Aravamudhan et al. | |
| 10,470,077 B1 | 11/2019 | Kodaypak et al. | |
| 10,506,403 B2 | 12/2019 | McCann | |
| 10,511,998 B1 | 12/2019 | Vallur | |
| 10,517,138 B2 | 12/2019 | Starsinic et al. | |
| 10,530,599 B2 | 1/2020 | McCann | |
| 10,536,211 B2 | 1/2020 | Leroux | |
| 10,542,459 B2 | 1/2020 | Hua et al. | |
| 10,548,000 B2 | 1/2020 | Jain et al. | |
| 10,548,062 B2 | 1/2020 | Cui et al. | |
| 10,555,202 B1 | 2/2020 | Narayanan et al. | |
| 10,575,278 B2 | 2/2020 | Kim et al. | |
| 10,581,623 B2 | 3/2020 | Lu et al. | |
| 10,588,085 B2 | 3/2020 | Kim et al. | |
| 10,595,268 B2 | 3/2020 | Lee et al. | |
| 10,601,932 B2 | 3/2020 | Kodaypak et al. | |
| 10,602,322 B2 | 3/2020 | Palanisamy et al. | |
| 10,602,441 B2* | 3/2020 | Palanisamy | H04W 68/005 |
| 10,609,154 B2 | 3/2020 | Talebi Fard et al. | |
| 10,616,802 B2 | 4/2020 | Krishan et al. | |
| 10,623,161 B2 | 4/2020 | Åström et al. | |
| 10,631,266 B2 | 4/2020 | Park et al. | |
| 10,637,779 B1 | 4/2020 | Mukherjee et al. | |
| 10,652,085 B2 | 5/2020 | Ryu et al. | |
| 10,652,098 B2 | 5/2020 | Kim | |
| 10,652,850 B2 | 5/2020 | Landais et al. | |
| 10,742,744 B1 | 8/2020 | Mahalank et al. | |
| 10,791,508 B2 | 9/2020 | Park et al. | |
| 10,805,036 B2 | 10/2020 | Ronneke et al. | |
| 10,805,178 B2 | 10/2020 | Livanos et al. | |
| 10,805,841 B2 | 10/2020 | Livanos et al. | |
| 10,820,231 B2 | 10/2020 | Huang et al. | |
| 10,827,332 B2 | 11/2020 | McCann | |
| 10,945,120 B2 | 3/2021 | Gupta et al. | |
| 10,972,368 B2 | 4/2021 | Sapra et al. | |
| 11,146,577 B2 | 10/2021 | Gupta et al. | |
| 2004/0203744 A1 | 10/2004 | Hicks et al. | |
| 2005/0220019 A1 | 10/2005 | Melpignano | |
| 2006/0075481 A1 | 4/2006 | Ross et al. | |
| 2007/0297333 A1 | 12/2007 | Zuk et al. | |
| 2008/0039132 A1 | 2/2008 | Delibie et al. | |
| 2010/0029301 A1 | 2/2010 | Pyo et al. | |
| 2010/0118847 A1 | 5/2010 | Lee et al. | |
| 2011/0302244 A1 | 12/2011 | McCann et al. | |
| 2012/0207113 A1 | 8/2012 | Yoon et al. | |
| 2012/0233694 A1 | 9/2012 | Baliga et al. | |
| 2012/0320766 A1 | 12/2012 | Sridhar | |
| 2013/0041997 A1 | 2/2013 | Li et al. | |
| 2013/0044596 A1 | 2/2013 | Zhi et al. | |
| 2013/0080782 A1 | 3/2013 | Rajadurai et al. | |
| 2013/0081138 A1 | 3/2013 | Rados et al. | |
| 2013/0272247 A1 | 10/2013 | Guo | |
| 2013/0336305 A1 | 12/2013 | Yan et al. | |
| 2014/0078968 A1 | 3/2014 | Korhonen et al. | |
| 2014/0086214 A1 | 3/2014 | Hong et al. | |
| 2014/0089442 A1 | 3/2014 | Kim et al. | |
| 2014/0153391 A1 | 6/2014 | Ludwig et al. | |
| 2014/0189151 A1 | 7/2014 | Aviv et al. | |
| 2014/0334386 A1 | 11/2014 | Fukumasa et al. | |
| 2014/0376426 A1 | 12/2014 | Boudreau et al. | |
| 2014/0376454 A1 | 12/2014 | Boudreau et al. | |
| 2015/0036591 A1 | 2/2015 | Cao et al. | |
| 2015/0055459 A1 | 2/2015 | Wong et al. | |
| 2015/0067328 A1 | 3/2015 | Yin | |
| 2015/0110000 A1 | 4/2015 | Zhang et al. | |
| 2015/0111533 A1 | 4/2015 | Chandramouli et al. | |
| 2015/0111574 A1 | 4/2015 | Fukumasa et al. | |
| 2015/0235164 A1 | 8/2015 | Key | |
| 2015/0256440 A1 | 9/2015 | Jeong et al. | |
| 2015/0319172 A1 | 11/2015 | Zhang et al. | |
| 2016/0007138 A1 | 1/2016 | Palanisamy et al. | |
| 2016/0007170 A1 | 1/2016 | Vaidya et al. | |
| 2016/0085594 A1 | 3/2016 | Wang et al. | |
| 2016/0142860 A1 | 5/2016 | Kim et al. | |
| 2016/0183156 A1 | 6/2016 | Chin et al. | |
| 2016/0277243 A1 | 9/2016 | Kim et al. | |
| 2016/0277530 A1 | 9/2016 | Jung et al. | |
| 2016/0330647 A1 | 11/2016 | Iwai | |
| 2016/0337127 A1 | 11/2016 | Schultz et al. | |
| 2016/0337841 A1 | 11/2016 | Won et al. | |
| 2016/0344635 A1 | 11/2016 | Lee et al. | |
| 2016/0373591 A1 | 12/2016 | Sharma et al. | |
| 2017/0041231 A1 | 2/2017 | Seed et al. | |
| 2017/0093902 A1 | 3/2017 | Roundy et al. | |
| 2017/0126512 A1 | 5/2017 | Seed et al. | |
| 2017/0171235 A1 | 6/2017 | Mulchandani et al. | |
| 2017/0195822 A1 | 7/2017 | Watfa et al. | |
| 2017/0244629 A1 | 8/2017 | Kodaypak et al. | |
| 2017/0244670 A1 | 8/2017 | Maria | |
| 2017/0295557 A1 | 10/2017 | Chamarty et al. | |
| 2017/0318570 A1 | 11/2017 | Shaw et al. | |
| 2017/0347283 A1 | 11/2017 | Kodaypak | |
| 2018/0035351 A1 | 2/2018 | Kodaypak | |
| 2018/0070268 A1 | 3/2018 | Iwai et al. | |
| 2018/0077714 A1 | 3/2018 | Kodaypak et al. | |
| 2018/0092133 A1 | 3/2018 | Starsinic et al. | |
| 2018/0109632 A1 | 4/2018 | Stammers et al. | |
| 2018/0109941 A1 | 4/2018 | Jain et al. | |
| 2018/0124110 A1 | 5/2018 | Hunt et al. | |
| 2018/0124544 A1 | 5/2018 | Gupta et al. | |
| 2018/0192234 A1* | 7/2018 | Mohamed | H04L 67/18 |
| 2018/0206093 A1 | 7/2018 | Jain et al. | |
| 2018/0212710 A1 | 7/2018 | Ronneke et al. | |
| 2018/0213391 A1 | 7/2018 | Inoue | |
| 2018/0213991 A1 | 8/2018 | Youk et al. | |
| 2018/0227322 A1 | 8/2018 | Luo et al. | |
| 2018/0234291 A1 | 8/2018 | Mathison et al. | |
| 2018/0241615 A1 | 8/2018 | Livanos et al. | |
| 2018/0248711 A1 | 8/2018 | McCann | |
| 2018/0249281 A1 | 8/2018 | McCann | |
| 2018/0249282 A1 | 8/2018 | McCann | |
| 2018/0255421 A1 | 9/2018 | Hua et al. | |
| 2018/0262941 A1 | 9/2018 | Huang et al. | |
| 2018/0263013 A1 | 9/2018 | Jain et al. | |
| 2018/0324671 A1 | 11/2018 | Palnati et al. | |
| 2018/0332462 A1 | 11/2018 | Kim et al. | |
| 2018/0376417 A1 | 12/2018 | Wang et al. | |
| 2019/0007329 A1 | 1/2019 | Velev et al. | |
| 2019/0021121 A1 | 1/2019 | Aravamudhan et al. | |
| 2019/0028337 A1* | 1/2019 | Ryu | H04W 4/70 |
| 2019/0037441 A1 | 1/2019 | Liu et al. | |
| 2019/0058962 A1 | 2/2019 | Aravamudhan et al. | |
| 2019/0069211 A1 | 2/2019 | Ronneke et al. | |
| 2019/0069221 A1 | 2/2019 | Virgile et al. | |
| 2019/0141527 A1 | 5/2019 | Krishan | |

(56) References Cited

U.S. PATENT DOCUMENTS

| | | | |
|---|---|---|---|
| 2019/0191274 | A1 | 6/2019 | Fontaine |
| 2019/0230492 | A1 | 7/2019 | Suzuki et al. |
| 2019/0238425 | A1 | 8/2019 | Mladin et al. |
| 2019/0238584 | A1 | 8/2019 | Somasundaram et al. |
| 2019/0253875 | A1 | 8/2019 | Vittal |
| 2019/0274086 | A1* | 9/2019 | Cui ................. H04W 40/28 |
| 2019/0306251 | A1 | 10/2019 | Talebi Fard et al. |
| 2019/0349426 | A1 | 11/2019 | Smith et al. |
| 2019/0364064 | A1 | 11/2019 | Gupta et al. |
| 2019/0387460 | A1 | 12/2019 | Jonnala et al. |
| 2020/0021953 | A1 | 1/2020 | Mahalank |
| 2020/0021965 | A1 | 1/2020 | McCann |
| 2020/0028973 | A1 | 1/2020 | Livanos et al. |
| 2020/0037203 | A1 | 1/2020 | Ianev et al. |
| 2020/0053628 | A1 | 2/2020 | Wang et al. |
| 2020/0053686 | A1 | 2/2020 | Edge et al. |
| 2020/0053802 | A1 | 2/2020 | Li et al. |
| 2020/0059927 | A1 | 2/2020 | Sun et al. |
| 2020/0068047 | A1 | 2/2020 | Huang et al. |
| 2020/0068626 | A1 | 2/2020 | Cakulev et al. |
| 2020/0077253 | A1 | 3/2020 | Kim et al. |
| 2020/0077303 | A1 | 3/2020 | Krishan et al. |
| 2020/0077361 | A1 | 3/2020 | Huang et al. |
| 2020/0084277 | A1 | 3/2020 | Somaraju |
| 2020/0084677 | A1 | 3/2020 | Yiu et al. |
| 2020/0092706 | A1 | 3/2020 | Kawasaki et al. |
| 2020/0100080 | A1 | 3/2020 | Mladin et al. |
| 2020/0100088 | A1 | 3/2020 | Kim et al. |
| 2020/0100291 | A1 | 3/2020 | Ravishankar et al. |
| 2020/0106695 | A1 | 4/2020 | Rk et al. |
| 2020/0120027 | A1 | 4/2020 | Mukherjee et al. |
| 2020/0120475 | A1 | 4/2020 | Gupta |
| 2020/0120478 | A1 | 4/2020 | Kim |
| 2020/0128566 | A1 | 4/2020 | Wei et al. |
| 2020/0128613 | A1* | 4/2020 | Starsinic ............. H04W 76/40 |
| 2020/0136911 | A1 | 4/2020 | Assali et al. |
| 2020/0137675 | A1 | 4/2020 | Park et al. |
| 2020/0145309 | A1 | 5/2020 | Soderlund |
| 2020/0146077 | A1 | 5/2020 | Li et al. |
| 2020/0229265 | A1 | 7/2020 | Wang et al. |
| 2020/0275257 | A1 | 8/2020 | Gupta et al. |
| 2020/0296665 | A1 | 9/2020 | Huang et al. |
| 2020/0314760 | A1 | 10/2020 | Ye et al. |
| 2020/0322884 | A1 | 10/2020 | Di Girolamo et al. |
| 2020/0344576 | A1* | 10/2020 | Li ......................... H04W 4/06 |
| 2020/0366577 | A1 | 11/2020 | Sapra et al. |
| 2020/0412597 | A1 | 12/2020 | Goel et al. |
| 2021/0204200 | A1 | 7/2021 | Krishan et al. |

FOREIGN PATENT DOCUMENTS

| | | |
|---|---|---|
| CN | 113273230 B | 11/2021 |
| EP | 3 018 946 A1 | 5/2016 |
| EP | 3 653 016 B1 | 8/2021 |
| EP | 3 586 528 B1 | 12/2021 |
| EP | 3 586 530 B1 | 1/2022 |
| JP | 2017-168270 | 9/2017 |
| WO | WO-2010/021886 A1 | 2/2010 |
| WO | WO 2016/156549 A1 | 10/2016 |
| WO | WO 2016/200357 A1 | 12/2016 |
| WO | WO 2017/004158 A1 | 1/2017 |
| WO | WO 2017/017879 A1 | 2/2017 |
| WO | WO 2018/156318 A1 | 8/2018 |
| WO | WO 2018/156319 A1 | 8/2018 |
| WO | WO 2018/156320 A1 | 8/2018 |
| WO | WO 2019/014505 A1 | 1/2019 |
| WO | WO 2019/090270 A1 | 5/2019 |
| WO | WO 2020/081144 A1 | 4/2020 |
| WO | WO 2020/171899 A1 | 8/2020 |
| WO | WO 2020/176172 A1 | 9/2020 |
| WO | WO 2020/210026 A1 | 10/2020 |
| WO | WO 2020/263486 A1 | 12/2020 |

OTHER PUBLICATIONS

Notice of Allowance and Fee(s) Due for U.S. Appl. No. 16/162,101 (dated Dec. 20, 2019).

Notification of Transmittal of the International Search Report and the Written Opinion of the International Searching Authority, or the Declaration for International Application No. PCT/US2019/044445 (dated Sep. 30, 2019).

Fajardo et al., "RFC 6733—Diameter Base Protocol," Internet Engineering Task Force (IETF), pp. 1-153 (Oct. 2012).

"Universal Mobile Telecommunications System (UMTS); LTE; Home Subscriber Server (HSS) diameter interfaces for interworking with packet data networks and applications (3GPP TS 29.336 version 15.4.0 Release 15)," ETSI TS 129 336 V15.4.0 (Sep. 2018).

3GPP, "Technical Specification Group Services and System Aspects; Architecture enhancements to facilitate communications with packet data networks and applications," TS 23.682, V16.0.0 (Release 16), pp. 1-126 (Sep. 2018).

3GPP, "Technical Specification Group Core Network and Terminals; Numbering, addressing and identification" TS 23.003, V15.5.0 (Release 15), pp. 1-128 (Sep. 2018).

3GPP, "Technical Specification Group Core Network and Terminals; Home Subscriber Server (HSS) diameter interfaces for interworking with packet data networks and applications," TS 29.336, V15.3.0, pp. 1-71 (Jun. 2018).

3GPP, "Technical Specification Group Core Network and Terminals; TSP interface protocol between the MTC Interworking Function (MTC-IWF) and Service Capability Server (SCS)," TS 29.368, V15.0.0, pp. 1-33 (Jun. 2018).

Aboba et al., "RFC 4282—The Network Access Identifier," Network Working Group, pp. 1-17 (Dec. 2005).

Final Office Action for U.S. Appl. No. 15/990,196 (dated Sep. 18, 2020).

Communication of European publication number and information on the application of Article 67(3) EPC for European Patent Application Serial No. 18815391.0 (dated Aug. 19, 2020).

Notice of Allowance and Fee(s) Due for U.S. Appl. No. 16/575,962 (dated Jul. 28, 2020).

Communication pursuant to Article 94(3) EPC for European Patent Application Serial No. 18 706 338.3 (dated Jul. 20, 2020).

Communication pursuant to Article 94(3) EPC for European Patent Application Serial No. 18 705 270.9 (dated Jul. 20, 2020).

Communication pursuant to Article 94(3) EPC for European Patent Application Serial No. 18 704 770.9 (dated Jul. 14, 2020).

Communication of European publication number and information on the application of Article 67(3) EPC for European Patent Application Serial No. 18755330.0 (dated Apr. 22, 2020).

Non-Final Office Action and Examiner-Initiated Interview Summary for U.S. Appl. No. 15/990,196 (dated Apr. 3, 2020).

Notice of Allowance and Fee(s) Due for U.S. Appl. No. 16/121,203 (dated Nov. 18, 2019).

Notice of Allowance and Fee(s) Due, Examiner-Initiated Interview Summary, and AFCP 2.0 Decision for U.S. Appl. No. 15/608,595 (dated Aug. 20, 2019).

Notice of Allowance and Fee(s) Due and AFCP 2.0 Decision for U.S. Appl. No. 15/604,132 (dated Aug. 8, 2019).

Notice of Allowance and Fee(s) Due for U.S. Appl. No. 15/649,627 (dated May 30, 2019).

Final Office Action for U.S. Appl. No. 15/608,595 (dated Apr. 29, 2019).

Applicant-Initiated Interview Summary for U.S. Appl. No. 15/608,595 (dated Apr. 22, 2019).

Notice of Allowance and Fee(s) Due for U.S. Appl. No. 15/499,847 (dated Apr. 17, 2019).

Final Office Action for U.S. Appl. No. 15/604,132 (dated Apr. 16, 2019).

Notice of Allowance and Fee(s) Due for U.S. Appl. No. 15/679,124 (dated Feb. 12, 2019).

Notification of Transmittal of the International Search Report and the Written Opinion of the International Searching Authority, or the Declaration for International Application Serial No. PCT/US2018/059282 (dated Feb. 11, 2019).

Non-Final Office Action for U.S. Appl. No. 15/649,627 (dated Jan. 23, 2019).

(56) References Cited

OTHER PUBLICATIONS

Applicant-Initiated Interview Summary for U.S. Appl. No. 15/499,847 (dated Jan. 22, 2019).
Applicant-Initiated Interview Summary for U.S. Appl. No. 15/604,132 (dated Jan. 22, 2019).
Non-Final Office Action for U.S. Appl. No. 15/608,595 (dated Jan. 8, 2019).
Notice of Allowance and Fee(s) Due for U.S. Appl. No. 15/804,974 (dated Nov. 13, 2018).
Notification of Transmittal of the International Search Report and the Written Opinion of the International Searching Authority, or the Declaration for International Application Serial No. PCT/US2018/041911 (dated Oct. 12, 2018).
Non-Final Office Action for U.S. Appl. No. 15/679,124 (dated Oct. 4, 2018).
Non-Final Office Action for U.S. Appl. No. 15/604,132 (dated Oct. 2, 2018).
Non-Final Office Action for U.S. Appl. No. 15/499,847 (dated Oct. 2, 2018).
"3rd Generation Partnership Project; Technical Specification Group Services and System Aspects; Architecture enhancements to facilitate communications with packet data networks and applications (Release 15)," 3GPP TS 23.682, V15.5.0, pp. 1-125 (dated Jun. 2018).
Non-Final Office Action for U.S. Appl. No. 15/804,974 (dated May 10, 2018).
Notification of Transmittal of the International Search Report and the Written Opinion of the International Searching Authority, or the Declaration for International Application No. PCT/US2018/016044 (dated Apr. 24, 2018).
Notification of Transmittal of the International Search Report and the Written Opinion of the International Searching Authority, or the Declaration for International Application No. PCT/US2018/016047 (dated Apr. 24, 2018).
Notification of Transmittal of the International Search Report and the Written Opinion of the International Searching Authority, or the Declaration for International Application No. PCT/US2018/016045 (dated Apr. 24, 2018).
"3rd Generation Partnership Project; Technical Specification Group Services and System Aspects; Architecture enhancements to facilitate communications with packet data networks and applications (Release 15)," 3GPP TS 23.682, V15.4.0, pp. 1-122 (Mar. 2018).
"3rd Generation Partnership Project; Technical Specification Group Services and System Aspects; General Packet Radio Service (GPRS) enhancements for Evolved Universal Terrestrial Radio Access Network (E-UTRAN) access (Release 15)," 3GPP TS 23.401, V15.3.0, pp. 1-405 (Mar. 2018).
"Universal Mobile Telecommunications System (UMTS); LTE; Diameter-based T4 Interface for communications with packet data networks and applications (3GPP TS 29.337 V14.2.0 Release 14)," ETSI TS 129 337 V14.2.0, pp. 1-25 (Oct. 2017).
"Universal Mobile Telecommunications System (UMTS); LTE; Evolved Packet System (EPS); Mobility Management Entity (MME) and Serving GPRS Support Node (SGSN) related interfaces based on Diameter protocol (3GPP TS 29.272 V14.4.0 Release 14)," ETSI TS 129 272 V14.4.0, pp. 1-171 (Jul. 2017).
"Universal Mobile Telecommunications System (UMTS); LTE; Home Subscriber Server (HSS) diameter interfaces for interworking with packet data networks and applications (3GPP TS 29.336 V14.1.0 Release 14)," ETSI TS 129 336 V14.1.0, pp. 1-66 (May 2017).
"Digital cellular telecommunications system (Phase 2+) (GSM); Universal Mobile Telecommunications System (UMTS); LTE; Circuit Switched (CS) fallback in Evolved Packet System (EPS); Stage 2 (3GPP TS 23.272 V14.0.0 Release 14)," ETSI TS 123 272 V14.0.0, pp. 1-105 (May 2017).
"LTE; General Packet Radio Service (GPRS) enhancements for Evolved Universal Terrestrial Radio Access Network (E-UTRAN) access (3GPP TS 23.401 V14.3.0 Release 14)," ETSI TS 123 401 V14.3.0, pp. 1-392 (May 2017).
"LTE; Evolved Universal Terrestrial Radio Access Network (E-UTRAN); S1 Application Protocol (S1AP) (3GPP Ts 36.413 version 14.2.0 Release 14)," ETSI TS 136 413, V14.2.0, pp. 1-349 (Apr. 2017).
"Universal Mobile Telecommunications System (UMTS); LTE; TSP interface protocol between the MTC Interworking Function (MTC-IWF) and Service Capability Server (SCS) (3GPP TS 29.368 V14.1.0 Release 14)," ETSI TS 129 368 V14.1.0, pp. 1-34 (Apr. 2017).
"3rd Generation Partnership Project; Technical Specification Group Services and System Aspects; Architecture enhancements to facilitate communications with packet data networks and applications (Release 15)," 3GPP Ts 23.682 V15.0.0, pp. 1-109 (Mar. 2017).
"3rd Generation Partnership Project; Technical Specification Group Core Network and Terminals; Home Subscriber Server (HSS) diameter interfaces for interworking with packet data networks and applications (Release 14)," 3GPP TS 29.336 V.14.1.0, pp. 1-67 (May 2017).
"3rd Generation Partnership Project; Technical Specification Group Services and System Aspects; Architecture enhancements to facilitate communications with packet data networks and applications (Release 14)," 3GPP TS 23.682, V14.2.0, pp. 1-104 (Dec. 2016).
"Change Request," InterDigital, Meeting ARC#25, Doc# ARC-2016-0439-TS-0026_sec5_sec6.1, pp. 1-16 (Oct. 17, 2016).
Abu-Lebdeh et al., "A Virtual Network PaaS for 3GPP 4G and Beyond Core Network Services," pp. 1-7 (Aug. 20, 2016).
Donovan, "Diameter Routing Message Priority," RFC 7944, pp. 1-18 (Aug. 2016).
"Universal Mobile Telecommunications System (UMTS); Mobility Management Entity (MME) and Serving GPRS Support Node (SGSN) interfaces for interworking with packet data and applications (3GPP TS 29.128 V13.0.0, Release 13)," ETSI TS 129.128 V13.0.0, pp. 1-40 (May 2016).
"Universal Mobile Telecommunications System (UMTS); LTE; Home Subscriber Server (HSS) diameter interfaces for interworking with packet data networks and applications (3GPP TS 29.339 version 13.3.0 Release 13)," ETSI TS 129 336 V13.3.0, pp. 1-56 (Apr. 2016).
"3rd Generation Partnership Project; Technical Specification Group Services and System Aspects; Architecture enhancements to facilitate communications with packet data networks and applications (Release 13)," 3GPP TS 23.682 V13.5.0, pp. 1-90 (Mar. 2016).
"Digital cellular telecommunications system (Phase 2+) (GSM); Universal Mobile Telecommunications System (UMTS); LTE; Architecture enhancements to facilitate communications with packet data networks and applications (3GPP Ts 23.682 V13.4.0 Release 13)," ETSI TS 123 682 V13.4.0, pp. 1-82 (Mar. 2016).
"Universal Mobile Telecommunications System (UMTS); LTE; Home Subscriber Server (HSS) diameter interfaces for interworking with packet data networks and applications (3GPP TS 29.336 V13.2.0 Release 13)," ETSI TS 129.336 V13.2.0, pp. 1-48 (Mar. 2016).
"Routing Non-IP Data to/from Multiple UE Applicatons and Multiple SCS/AS's," Convida Wireless, 3FPP TSG-SA WG2 #113AH, pp. 1-6 (Feb. 2016).
"Cloud Innovation Solution," ZTE Corporation, pp. 1-31 (2016).
Taleb et al., "EASE: EPC as a Service to Ease Mobile Core Network Deployment over Cloud," IEEE Network, pp. 78-88 (Mar./Apr. 2015).
"Universal Mobile Telecommunications System (UMTS); LTE; Tsp interface protocol between the MTC Interworking Function (MTC-IWF) and Service Capability Server (SCS) (3GPP TS 29.368 V12.2.0 Release 12)," ETSI TS 129.368 V12.2.0, pp. 1-29 (Oct. 2014).
Mendyk, "NFV + SDN—network in the cloud or cloud in the network?," NFV/IT Transformation, pp. 1-3 (Oct. 7, 2014).
Taleb et al., "Virtualizing the LTE Evolved Packet Core (EPC)," Proc. European Conf. on Networks and Communications (EUCNC), pp. 1-2 (Jun. 2014).
Fajardo et al., "Diameter Base Protocol," RFC 6733, pp. 1-152 (Oct. 2012).
"Digital cellular telecommunications system (Phase 2+); Universal Mobile Telecommunications System (UMTS); LTE; Service require-

(56) References Cited

OTHER PUBLICATIONS ments for Machine-Type Communications (MTC); Stage 1 (3GPP TS 22.368 V11.6.0 Release 11)," ETSI TS 122 368 V11.6.0, pp. 1-20 (Sep. 2012).
Notice of Allowance and Fee(s) Due for U.S. Appl. No. 16/287,808 (dated Nov. 4, 2020).
Applicant-Initiated Interview Summary for U.S. Appl. No. 16/415,758 (dated Oct. 20, 2020).
Notification of Transmittal of the International Search Report and the Written Opinion of the International Searching Authority, or the Declaration for International Application Serial No. PCT/US2020/024518 (dated Jul. 10, 2020).
Non-Final Office Action for U.S. Appl. No. 16/287,808 (dated Jun. 16, 2020).
Non-Final Office Action for U.S. Appl. No. 16/415,758 (dated May 26, 2020).
Notification of Transmittal of the International Search Report and the Written Opinion of the International Searching Authority, or the Declaration for International Application Serial No. PCT/US2020/013960 (dated Apr. 20, 2020).
Notice of Allowance and Fee(s) Due for U.S. Appl. No. 16/399,428 (dated Apr. 6, 2020).
Notification of Transmittal of the International Search Report and the Written Opinion of the International Searching Authority, or the Declaration for International Application Serial No. PCT/US2020/013961 (Mar. 31, 2020).
Notice of Allowance and Fee(s) Due for U.S. Appl. No. 16/280,672 (dated Sep. 25, 2019).
Commonly-Assigned, co-pending U.S. Appl. No. 16/415,758 for "Methods, Systems, and Computer Readable Media for Providing Reduced Signaling Internet of Things (Iot) Device Monitoring," (Unpublished, filed May 17, 2019).
Commonly-Assigned, co-pending U.S. Appl. No. 16/399,428 for "Methods, Systems, and Computer Readable Media for Monitoring Lightweight Machine to Machine (LWM2M) Internet of Things (IoT) Devices Through Service Capability Exposure Function (SCEF) T8 Interface," (Unpublished, filed Apr. 30, 2019).
"3rd Generation Partnership Project; Technical Specification Group Core Network and Terminals; Home Subscriber Server (HSS) diameter interfaces for interworking with packet data networks and applications (Release 15)," 3GPP Ts 29.336, V15.6.0, pp. 1-79 (Mar. 2019).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 15)," 3GPP TS 29.272, V15.7.0, pp. 1-179 (Mar. 2019).
"3rd Generation Partnership Project; Technical Specification Group Services and System Aspects; Architecture enhancements to facilitate communications with packet data networks and applications (Release 16)," 3GPP TS 23.682, V16.2.0, pp. 1-126 (Mar. 2019).
"3rd Generation Partnership Project; Technical Specification Group Core Network and Terminals; T8 reference point for Northbound APIs; (Release 16)," 3GPP TS 29.122, V16.1.0, pp. 1-288 (Mar. 2019).
Commonly-Assigned, co-pending U.S. Appl. No. 16/280,672 for "Methods, Systems, and Computer Readable Media for (IoT) Device State Through Service Capability Exposure Function (SCEF)," (Unpublished, filed Feb. 20, 2019).
"OMA Lightweight Machine to Machine Requirements," Candidate Version 1.2, Open Mobile Alliance, pp. 1-20 (Jan. 24, 2019).
"3rd Generation Partnership Project; Technical Specification Group Services and System Aspects; Architecture enhancements to facilitate communications with packet data networks and applications (Release 16)," 3GPP TS 23.682, V16.1.0, pp. 1-126 (Dec. 2018).
"3rd Generation Partnership Project; Technical Specification Group Radio Access Network; Evolved Universal Terrestrial Radio Access Network (E-UTRAN); S1 Application Protocol (S1AP) (Release 15)," 3GPP TS 36.413, V15.4.0, pp. 1-383 (Dec. 2018).

"3rd Generation Partnership Project; Technical Specification Group Core Network and Terminals; Home Subscriber Server (HSS) diameter interfaces for interworking with packet data networks and applications (Release 15)," 3GPP TS 29.336, V15.5.0, pp. 1-74 (Dec. 2018).
"3rd Generation Partnership Project; Technical Specification Group Core Network and Terminals; Mobility Management Entity (MME) and Serving GPRS Support Node (SGSN) interfaces for interworking with packet data networks and applications (Release 15)," 3GPP TS 29.128, V15.4.0, pp. 1-52 (Dec. 2018).
"3rd Generation Partnership Project; Technical Specification Group Core Network and Terminals; T8 reference point for Northbound APIs; (Release 15)," 3GPP TS 29.122, V15.2.0, pp. 1-297 (Dec. 2018).
"3rd Generation Partnership Project; Technical Specification Group Core Network and Terminals; Mobile Application Part (MAP) specification (Release 15)," 3GPP TS 29.002, V15.4.0, pp. 1-1021 (Dec. 2018).
"Diameter Signaling Router SCEF User's Guide," Release 8.3, E93572, Oracle® Communications, pp. 1-110 (Sep. 2018).
"3rd Generation Partnership Project; Technical Specification Group Services and System Aspects; Universal Geographical Area Description (GAD) (Release 15)," 3GPP TS 23.032, pp. 1-32 (Sep. 2018).
"Lightweight Machine to Machine Technical Specification: Transport Bindings," Approved Version: 1.1, Open Mobile Alliance, pp. 1-68 (Aug. 6, 2018).
"Universal Mobile Telecommunications System (UMTS); LTE; TSP interface protocol between the MTC Interworking Function (MTC-IWF) and Service Capability Server (SCS)," 3GPP TS 29.368, V15.0.0, pp. 1-35 (Jul. 2018).
"3rd Generation Partnership Project; Technical Specification Group Radio Access Network; Evolved Universal Terrestrial Radio Access Network (E-UTRAN); S1 signalling transport (Release 15)," 3GPP TS 36.412, V15.0.0, pp. 1-8 (Jun. 2018).
"3rd Generation Partnership Project; Technical Specification Group Core Network and Terminals; Customised Applications for Mobile network Enhanced Logic (CAMEL) Phase 4; Stage 2 (Release 15)," 3GPP TS 23.078, V15.0.0, pp. 1-750 (Jun. 2018).
"Lightweight Machine to Machine Technical Specification: Transport Bindings," Candidate Version: 1.1, Open Mobile Alliance, pp. 1-67 (Jun. 12, 2018).
"Lightweight Machine to Machine Technical Specification: Core," Candidate Version: 1.1, Open Mobile Alliance, pp. 1-142 (Jun. 12, 2018).
Mayer, Georg (Huawei), "3GPP 5G CoreNetwork Status," 3GPP A Global Initiative, pp. 1-23 (Nov. 2017).
"3rd Generation Partnership Project; Technical Specification Group Services and System Aspects; Architecture enhancements to facilitate communications with packet data networks and applications (Release 15)," 3GPP TS 23.682, V15.2.0, pp. 1-122 (Sep. 2017).
Hoglund et al., "Overview of 3GPP Release 14 Enhanced NB-IoT," in IEEE Network, vol. 31, No. 6, pp. 16-22 (Nov./Dec. 2017).
Kafle et al., "Scalable Directory Service for IoT Applications," in IEEE Communications Standards Magazine, vol. 1, No. 3, pp. 58-65 (Sep. 2017).
Kouzayha et al., "Measurement-Based Signaling Management Strategies for Cellular IoT," in IEEE Internet of Things Journal, vol. 4, No. 5, pp. 1434-1444 (Oct. 2017).
Yu, "The Mobile Network Capability Exposure Friendly to the Mobile Internet Applications," 2017 IEEE Wireless Communications and Networking Conference (WCNC), pp. 1-6 (2017).
Bormann et al., "Block-Wise Transfers in the Constrained Application Protocol (CoAP)," RFC 7959, pp. 1-37 (Aug. 2016).
"3rd Generation Partnership Project; Technical Specification Group Services and System Aspects; Architecture enhancements to facilitate communications with packet data networks and applications (Release 13)," 3GPP TS 23.682, V13.6.0, pp. 1-91 (Jun. 2016).
"3rd Generation Partnership Project; Technical Specification Group Services and System Aspects; Architecture enhancements to facilitate communications with packet data networks and applications (Release 13)," 3GPP TS 23.682, V13.4.0, pp. 1-81 (Dec. 2015).
Hartke, "Observing Resources in the Constrained Application Protocol (CoAP)," RFC 7641, pp. 1-30 (Sep. 2015).

(56) References Cited

OTHER PUBLICATIONS

Zte, "Reporting the Number of UEs in Certain Geographic Area," SA WG2 Meeting #107, pp. 1-4 (Jan. 30, 2015).
Ratasuk et al., "Overview of LTE Enhancements for Cellular IoT," 2015 IEEE 26th International Symposium on Personal, Indoor and Mobile Radio Communications—(PIMRC): Workshop on M2M Communications: Challenges, Solutions and Applications, pp. 1-5 (2015).
Hawilo et al., "NFV: State of the Art, Challenges, and Implementation in Next Generation Mobile Networks (vEPC)," IEEE Network, pp. 1-9 (Nov./Dec. 2014).
Abdullah et al., "Femtocell Geo-location Challenge: DSL Approach as Solution," 2014 IEEE 5th Control and System Graduate Research Colloquium, pp. 239-241 (Aug. 11, 2014).
Shelby et al., "The Constrained Application Protocol (CoAP)," RFC 7252, pp. 1-112 (Jun. 2014).
China Mobile, "Supporting legacy HLR in Architecture for MTC usage," SA WG2 Meeting #90, pp. 1-9 (Apr. 10, 2012).
Le et al., "Cross-Layer Mobility Management based on Mobile IP and SIP in IMS," 2007 International Conference on Wireless Communications, Networking and Mobile Computing, pp. 803-806 (2007).
Bertrand, "The IP Multimedia Subsystem in Next Generation Networks" Network, Multimedia and Security Department (RSM), pp. 1-9 (May 30, 2007).
Faccin et al., "IP multimedia services: analysis of mobile IP and SIP interactions in 3G networks," in IEEE Communications Magazine, vol. 42, No. 1, pp. 113-120 (Jan. 2004).
First Examination Report for Indian Patent Application Serial No. 201947032194 (dated Mar. 20, 2021).
Communication under Rule 71(3) EPC Intent to Grant for European Patent Application Serial No. 18 755 330.0 (dated Mar. 16, 2021).
Commonly-Assigned, co-pending U.S. Appl. No. 17/175,260 for "Methods, Systems, and Computer Readable Media for Short Message Delivery Status Report Validation," (Unpublished, filed Feb. 12, 2021).
SMS Test Numbers SMS Fake Delivery Receipts, Fake Dlr—Tel!—SMS Test Platform and SMS services, Nov. 6, 2020, pp. 1-6, https://telqtele.com/sms-fake-delivery-receipts-fake-dlr/.
3GPP TS 29.338 version 11.0.0 Release 11, "Diameter based protocols for support of SMS capable MMEs.," Universal Mobile Telecommunications System (UMTS); LTE; Jan. 2013, pp. 1-42, France.
Croft, N., "On Forensics: A Silent SMS Attack," Information and Computer Security Architectures (ICSA) Research Group, Department of Computer Science, pp. 1-4, University of Pretoria, South Africa (2012).
Constantin, L., "Remote SMS attack can force mobile phones to send premium-rate text messages: Applications installed by operators on SIM cards can be exploited remotely for SMS fraud and DoS purposes," IDG News Service, Dec. 19, 2011, pp. 1-5, IDG Communications, Inc., United States.
Advisory Action for U.S. Appl. No. 16/356,446 (dated Dec. 22, 2020).
Applicant-Initiated Interview Summary for U.S. Appl. No. 16/697,021 (dated Jan. 26, 2021).
Notice of Allowance and Fee(s) Due for U.S. Appl. No. 16/415,758 (dated Dec. 2, 2020).
"P-GW Administration Guide, StarOS Release 21.20," Cisco, pp. 1-1164 (Oct. 11, 2020).
"3rd Generation Partnership Project; Technical Specification Group Core Network and Terminals; Non-Access-Stratum (NAS) protocol for Evolved Packet System (EPS); Stage 3 (Release 17)," 3GPP TS 24.301, V17.0.0, pp. 1-585 (Sep. 2020).
3rd Generation Partnership Project; Technical Specification Group Services and System Aspects; Architecture enhancements to facilitate communications with packet data networks and applications (Release 16), 3GPP TS 23.682, V16.8.0, pp. 1-135 (Sep. 2020).
Interview Summary for U.S. Appl. No. 15/990,196 (dated Jan. 19, 2021).
"3rd Generation Partnership Project; Technical Specification Group Core Network and Terminals; Location Services (LCS); Diameter-based SLh interface for Control Plane LCS (Release 16)," 3GPP TS 29.173 V16.0.0, pp. 1-19 (Jul. 2020).
"3rd Generation Partnership Project; Technical Specification Group Services and System Aspects; Architecture enhancements to facilitate communications with packet data networks and applications (Release 16)," 3GPP TS 23.682 V16.7.0, pp. 1-134 (Jul. 2020).
"3rd Generation Partnership Project; Technical Specification Group Core Network and Terminals; Home Subscriber Server (HSS) diameter interfaces for interworking with packet data networks and applications (Release 16)," 3GPP TS 29.336 V16.2.0, pp. 1-79 (Jun. 2020).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 16)," 3GPP TS 29.272 V16.3.0, pp. 1-177 (Jun. 2020).
"3rd Generation Partnership Project; Technical Specification Group Core Network and Terminals; T8 reference point for Northbound APIs; (Release 16)," 3GPP TS 29.122 V16.6.0, pp. 1-360 (Jun. 2020).
"3rd Generation Partnership Project; Technical Specification Group Core Network and Terminals; Mobility Management Entity (MME) and Serving GPRS Support Node (SGSN) interfaces for interworking with packet data networks and applications (Release 16)," 3GPP TS 29.128 V16.1.0, pp. 1-51 (Mar. 2020).
"Oracle® Communications Diameter Signaling Router Service Capability Exposure Function User's Guide," Release 8.4, F12301-02, Oracle, pp. 1-150 (Jan. 2020).
Advisory Action for U.S. Appl. No. 15/990,196 (dated Jan. 4, 2021).
Notice of Intention to Grant for European Patent Application No. 187066338.3 (dated Aug. 17, 2021).
Notification of the First Office Action for Chinese Patent Application Serial No. 201880014276.1 (dated Aug. 4, 2021).
Communication of European publication number and information on the application of Article 67(3) EPC for European Patent Application Serial No. 18706338.3 (dated Dec. 4, 2019).
Notice of Allowance and Fee(s) Due for U.S. Appl. No. 15/990,196 (dated May 19, 2021).
Notice of Allowance and Fee(s) Due for U.S. Appl. No. 16/697,021 (dated Jun. 21, 2021).
Communication of European publication number and information on the application of Article 67(3) EPC for European Patent Application Serial No. 19752843.3 (dated Jul. 28, 2021).
Communication under Rule 71 (3) EPC Intention to Grant for European Patent Application Serial No. 18 704 770.9 (dated Jul. 28, 2021).
Examination Report for European Patent Application No. 18705270.9 (dated Jun. 25, 2021).
Notice of Decision to Grant for European Patent Application No. 18755330.0 (dated Jul. 29, 2021).
Notice of Decision to Grant for Chinese Patent Application Serial No. 202080007654.0 (dated Oct. 11, 2021).
First Examination Report for Indian Patent Application Serial No. 201947032003 (dated Oct. 6, 2021).
First Examination Report for Indian Patent Application Serial No. 201947032980 (dated Oct. 4, 2021).
Notification of the First Office Action for Chinese Patent Application Serial No. 201880070292.2 (dated Oct. 30, 2021).
Office Action for Japanese Patent Application Serial No. 2019-543087 (dated Oct. 12, 2021).
Office Action for Japanese Patent Application Serial No. 2019-542404 (Oct. 12, 2021).
"RAN1 Radio Layer 1 (Physical Layer)," 3GPP TSG RAN WG1-4, pp. 1-2 (Oct. 15, 2021).
Notice of Decision to Grant Chinese Application Serial No. 201880014276.1 (dated Jan. 26, 2022).
First Examination Report for Indian Patent Application Serial No. 201947045067 (dated Jan. 7, 2022).
Notice of Decision to Grant for European Patent Application No. 18706338.3 (dated Dec. 23, 2021).

(56) References Cited

OTHER PUBLICATIONS

Office Action for Japanese Patent Application Serial No. 2019-543040 (dated Dec. 10, 2021).
Notice of Decision to Grant for European Patent Application No. 18704770.9 (dated Dec. 2, 2021).
First Examination Report for Indian Patent Application Serial No. 202047015197 (dated Nov. 5, 2021).
Communication of European publication No. and information on the application of Article 67(3) EPC for European Patent Application Serial No. 18704770.9 (dated Dec. 4, 2019).
Communication of European publication No. and information on the application of Article 67(3) EPC for European Patent Application Serial No. 18705270.9 (dated Dec. 4, 2019).
Notice of Publication for European Patent Application Serial No. 20705568.2 (dated Dec. 8, 2021).
Notice of Publication for European Patent Application Serial No. 20705567.4 (dated Dec. 1, 2021).

* cited by examiner

400

| MONITORING TYPE | ONE-TIME ONLY/ CONTINUOUS ONLY/BOTH | T8 MONITORING TYPE VALUE | DIAMETER MONITORING-TYPE AVP |
|---|---|---|---|
| LOCATION REPORTING | ONE-TIME – "LAST KNOWN LOCATION" BOTH – CURRENT LOCATION AND LAST KNOWN LOCATION OTHERWISE | LOCATION_REPORTING | LOCATION_REPORTING |

| External ID and/or MSISDN | IMSI | Serving Nodes |
|---|---|---|
| username163@realm4, 381492895256378 | 16481234567 | MME A |
| 127465675555, username542@realm3 | 12542013249 | MME B |
| username21@realm2 | 13212312345 | MME C |
| 456787895256378 | 16574101778 | HSS 2, MME D |

FIG. 4B

METHODS, SYSTEMS, AND COMPUTER READABLE MEDIA FOR MONITORING MACHINE TYPE COMMUNICATIONS (MTC) DEVICE RELATED INFORMATION

TECHNICAL FIELD

The subject matter described herein relates to processing communications. More particularly, the subject matter described herein relates to methods, systems, and computer readable media for monitoring machine type communications (MTC) device related information.

BACKGROUND

The telecommunications industry anticipates that millions of machine type communications (MTC) devices catering to variety of use cases may impose a significant burden on telecommunication networks in the near future. This influx of MTC devices introduces a huge opportunity and unseen challenges for telecommunications industry. Current narrowband internet of things (NB-IoT) enhancements in long term evolution (LTE) networks permit MTC servers to use existing LTE procedures and infrastructure to facilitate communications involving MTC devices. Notably, existing connectivity with an MTC device still relies on LTE and 3rd Generation Partnership Project (3GPP) based procedures, which may not necessarily be needed for devices that frequently send and receive small amount amounts of data to an application server (AS).

Communications to MTC devices can significantly impact LTE networks. For example, LTE network nodes may be configured to authenticate requests or other messages that are directed to or are from an MTC device (e.g., a smart electricity meter, a smart refrigerator, a smart lamp, a smart water meter, etc.). Such message authentication may be performed by one or more core network nodes, e.g., home subscriber servers (HSSs). As the number of MTC devices that use an LTE network increases, the amount of MTC related traffic will increase, thereby increasing traffic load on the network, and the HSSs in particular. While additional resources and interfaces can be added to the HSSs to accommodate increased MTC related traffic, such solutions can be expensive and require significant time to implement.

SUMMARY

The subject matter described herein includes methods, systems, and computer readable media for monitoring machine type communications (MTC) device related information. One method occurring at an service capability exposure function (SCEF) node includes receiving a monitoring configuration request associated with an MTC device; sending, to a home subscriber server (HSS), a send routing information (SRI) request for requesting a serving network node associated with the MTC device; receiving, from the HSS, an SRI response indicating the serving network node associated with the MTC device; sending, to the serving network node, an insert subscriber data (ISD) request for requesting device related information; and receiving, from the serving network node, an ISD response including the device related information.

A system for monitoring MTC device related information includes an SCEF node comprising at least one processor, the SCEF node configured for: receiving a monitoring configuration request associated with an MTC device; sending, to an HSS, an SRI request for requesting a serving network node associated with the MTC device; receiving, from the HSS, an SRI response indicating the serving network node associated with the MTC device; sending, to the serving network node, an ISD request for requesting device related information; and receiving, from the serving network node, an ISD response including the device related information.

The subject matter described herein can be implemented in software in combination with hardware and/or firmware. For example, the subject matter described herein can be implemented in software executed by at least one processor. In one example implementation, the subject matter described herein may be implemented using a non-transitory computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term 'node' refers to at least one physical computing platform including one or more processors and memory.

As used herein, the terms 'engine' or 'function' can refer to software in combination with hardware and/or firmware for implementing features described herein.

BRIEF DESCRIPTION OF THE DRAWINGS

Aspects of the subject matter described herein will now be explained with reference to the accompanying drawings of which:

FIGS. 4A and 4B depict example location reporting monitoring event information and example mapping information;

DETAILED DESCRIPTION

Figure 1:
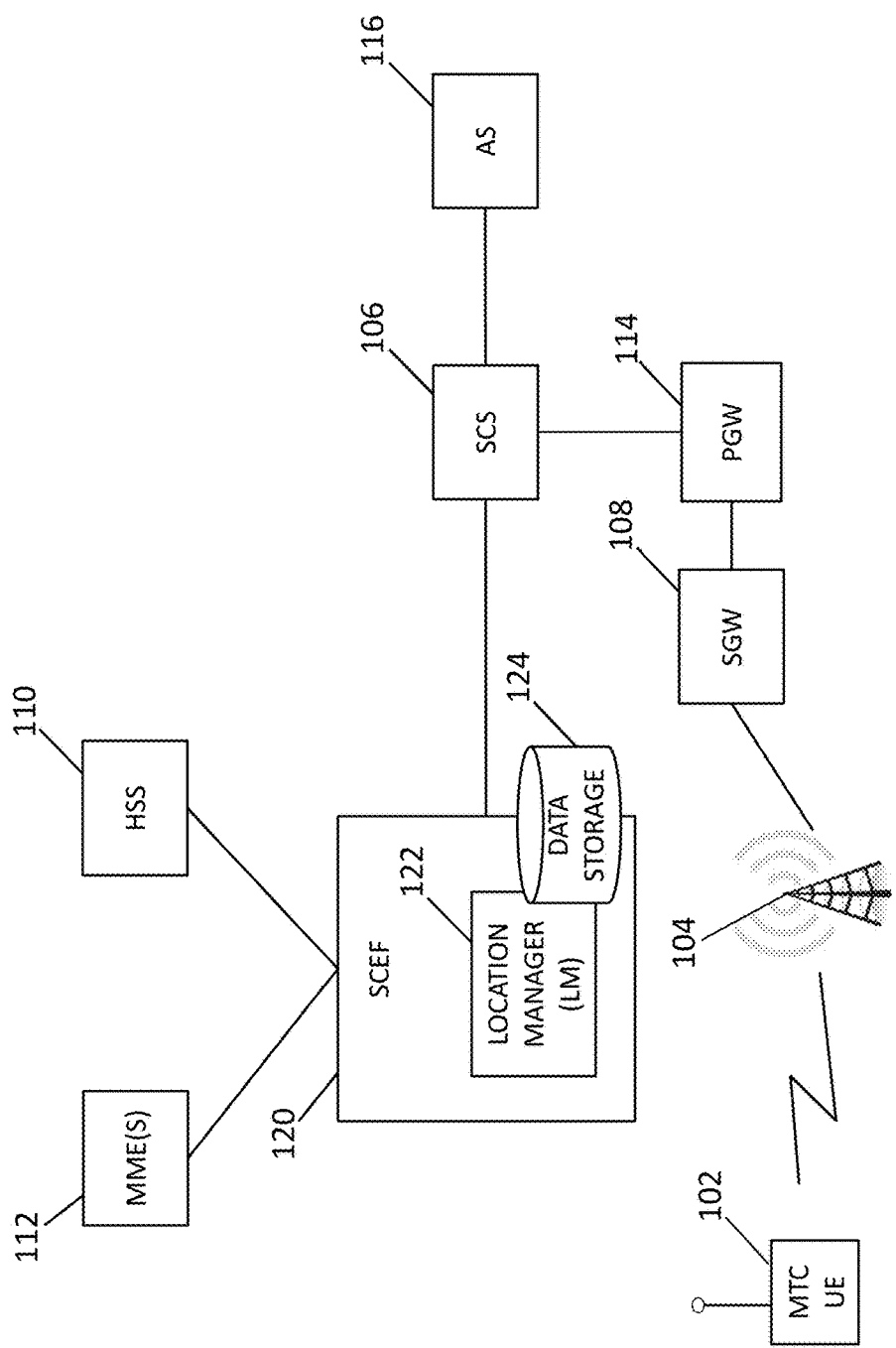
FIG. 1 is a block diagram illustrating an example communications environment for monitoring machine type communications (MTC) device related information.

The subject matter described herein relates to methods, systems, and computer readable media for monitoring machine type communications (MTC) device related information. Long term evolution (LTE) network deployments can be used by many subscribers for connecting to and over wireless networks. Prevalent use of LTE networks is enabling the telecommunications industry to continue the expansion into the internet of things (IoT) space and to support MTC use cases. MTC device characteristics are different to the characteristics exhibited by traditional mobile devices. Notably, MTC user equipment (UE) devices can be characterized as instruction-driven with very little human interaction. Additionally, UE devices can be characterized into different categories based on industry and use case. For example, MTC devices that enable smart lighting are classified as stationary, whereas fleet management devices are classified for their mobility based on their frequent change locations. Examples of a UE device includes, but is not limited to a wireless smart electricity meter, a wireless smart water meter, an IoT device, a machine-to-machine (M2M) device, or any other like device.

Various MTC related interactions involving the LTE infrastructure are described in various 3rd Generation Partnership Project (3GPP) technical specifications. Some relevant 3GPP technical specifications include 3GPP TS 29.122 version 16.6.0 Release 16, 3GPP TS 29.336 version 16.2.0 Release 16, 3GPP TS 29.128 version 16.1.0 Release 16, 3GPP TS 23.682 version 16.7.0 Release 16, 3GPP TS 29.173 version 16.0.0 Release 16, and 3GPP TS 29.272 version 16.3.0 Release 16; the disclosures of which are incorporated herein by reference in their entireties. For example, as described in one of the above listed 3GPP technical standards, an S6m interface may be used for communications between a Home Subscriber Server (HSS) and an MTC interworking function (MTC-IWF) and an S6t interface may be used for communications between an HSS and a service capability exposure function (SCEF). In this example, an MTC-IWF can be used to trigger a device whereas an SCEF can handle non-Internet protocol data delivery (NIDD). SCEF can also provide support for registering monitoring events with various network nodes, e.g., an HSS, a mobility management entity (MME), and/or a serving general packet radio service (GPRS) support node (SGSN).

MTC Monitoring event procedures may allow an MTC related service capability server and/or application server (SCS/AS) to monitor MTC device related information (e.g., location information, UE reachability information, roaming status information, and/or other information) using a T8 interface specified in TS 29.122. In this example, the SCS/AS may send a monitoring configuration request (e.g., a subscription request) to the SCEF via the T8 interface, where the request is for monitoring device related information. Continuing with this example, the SCEF may create a monitoring context and may facilitate obtaining and delivering device related information to the SCS/AS.

While 3GPP defined MTC monitoring event procedures exist, such procedures requires implementation of various interfaces (e.g., a S6m interface, a S6t interface, a T6a interface, a T6b interface, a T6ai interface, a T6bi interface, etc.) at different EPC network elements. However, some network equipment provider vendors of MMEs and HSSs are lagging behind in implementing the 3GPP defined interfaces required to support MTC monitoring event procedures. Hence, a network operator may have issues when attempting to implement or use 3GPP defined MTC monitoring event procedures in their network, especially if their network utilizes MMEs and HSSs lacking particular interfaces.

In accordance with some aspects of the subject matter described herein, techniques, methods, systems, or mechanisms are disclosed for monitoring MTC device related information. For example, on behalf of an SCS/AS, an SCEF can act as a subscriber location client and may request and obtain device related information (e.g., a last known attach time or device location information) from various serving network nodes, e.g., an HSS or an MME. In this example, the SCEF may be configured to use 3GPP defined MTC monitoring event procedures and to use other techniques or mechanisms when serving network nodes do not support some MTC related interfaces, e.g., by instead using existing Diameter related interfaces, e.g., S6a, S6d, and/or SLh interfaces.

Advantageously, in accordance with some aspects of the subject matter described herein, by utilizing techniques or mechanisms that use supported Diameter interfaces, an SCS/AS can request and obtain, via an SCEF, device related information (e.g., device location information) without requiring serving network nodes to support various MTC related interfaces.

Reference will now be made in detail to various embodiments of the subject matter described herein, examples of which are illustrated in the accompanying drawings. Wherever possible, the same reference numbers will be used throughout the drawings to refer to the same or like parts.

FIG. 1 is a block diagram illustrating an example communications environment 100 for monitoring MTC device related information. Communications environment 100 may include one or more nodes associated with a 4G network, an LTE network, an internet protocol (IP) Multimedia Core Network Subsystem (IMS) network, a LTE-advanced network, and/or an EPC network. For example, FIG. 1 includes a UE device 102, such as a wireless smart electricity meter, a wireless smart water meter, an IoT device, an M2M device, or any other like device that is capable of wirelessly communicating with an eNodeB 104 via 4G, LTE, or some other wireless access protocol.

In some embodiments, UE device 102 may be configured to wirelessly connect with eNodeB 104 via a wireless radio control link connection in order to facilitate communication with an MTC application server 116 or MTC application function accessible via an external network (e.g., the internet). UE device 102 may be configured to generate MTC data (e.g., water meter data, electrical meter data, etc.) on a periodic basis or on demand (e.g., in response to a device trigger message from MTC application server 116). In some embodiments, previous generation of MTC data at UE device 102 may imply that at least one device trigger message has been received in the past.

Communications environment 100 may also include various network elements, such as evolved packet system (EPS) network nodes and/or other nodes. For example, communications environment 100 may include a serving gateway (SGW) 108, an HSS 110, one or more MME(s) 112, a packet data network gateway (PGW) 114, and an MTC application server 116. In some embodiments, communications environment 100 and/or its related nodes may be configured to handle and facilitate traditional multimedia services (e.g., internet access, (voice over IP) VoIP call sessions, voice over LTE (VoLTE) call sessions, M2M sessions, MTC data transfer sessions, etc.) via established IP based data sessions requested by an MTC user equipment device.

SGW 108 represents a node or gateway for facilitating communications between an access network and another network in communications environment 100, e.g., an EPC network. SGW 108 may include an SGSN or related functionality. In some embodiments, SGW 108 may communicate user traffic to other nodes in communications environment 100. In some embodiments, SGW 108 may also perform one or more mobility management functions.

HSS 110 may represent any suitable entity or entities (e.g., software executing on at least one processor) for performing one or more aspects associated with storing, accessing, or using subscriber related information. For example, HSS 110 may include subscriber related information, such as user identification, control information for user authentication and authorization, location information, and user profile data.

In some embodiments, HSS 110 may receive subscriber information requests (SIRs) or other messages for requesting whether a subscriber or UE device is authorized for various communications or interactions. For example, HSS 110 may determine, using subscriber related data, whether a device trigger request is authorized for transmission or processing. In this example, if authorization is granted, HSS 110 may indicate authorization is granted to a routing or gateway node responsible for transmitting the device trigger request. However, in this example, if authorization is not granted, HSS 110 may indicate authorization is not granted to the routing or gateway node and the routing or gateway node may discard the device trigger request.

MME(s) 112 may represent one or more suitable entities for performing one or more mobility management functions, such as tracking UE device 102. In some embodiments, each of MMEs 112 may assigned to handle different UE devices and HSS 110 may be queried to identify a corresponding MME 112 handling a particular UE device, e.g., UE device 102.

Each of MME(s) 112 may communicate information (e.g., mobility-related information) to other nodes in communications environment 100. For example, MME(s) 112 may receive registration requests from a transceiver node in eNodeB 104 and may communicate with HSS 110 for performing authentication and/or for updating the current location of a subscriber or a related UE device. Additionally, in some embodiments, MME(s) 112 may communicate with various other nodes and perform various other functions.

PGW 114 may be any suitable entity for providing access to the internet or other data networks. For example, SGW 108 may communicate with PGW 114 to provide internet access to UE device 102. In this example, prior to providing internet access, SGW 108 and PGW 114 may request policy information from a policy engine, e.g., a policy and charging rules function (PCRF), in a home network associated with UE device 102.

Communications environment 100 may also include an SCEF 120, an location manager (LM) 122, a data storage 124, and a SCS 106. SCEF 120 may represent any suitable entity or entities (e.g., software executing on at least one processor) for performing one or more aspects associated with facilitating communications between MTC related nodes and LTE networks. For example, SCEF 120 may include an MTC-IWF or interworking functions that allow MTC related communications to traverse an LTE network. Some example functions performable by SCEF 120 may include termination of various reference points or communications interfaces associated MTC related communications, authorization of control plane requests from SCS 106, and HSS interrogation, among other things. For example, SCEF 120 may receive a device trigger request from SCS 106 and may request authorization from HSS 110 regarding the request. In this example, SCEF 120 may receive and indicate the authentication response to SCS 106 and, if appropriate, SCEF may select and provide an appropriate device trigger delivery mechanism for the request.

LM 122 may represent any suitable entity or entities (e.g., software executing on at least one processor) for performing one or more aspects associated with location monitoring of MTC related devices, e.g., IoT devices. For example, LM 122 may facilitate requesting, obtaining, and/or providing device related information (e.g., device location information) from HSS 110, MME(s) 112, and/or other entities, e.g., via MTC monitoring event procedures or other mechanisms or methods. In this example, when facilitating requesting, obtaining, and/or providing location monitoring, LM may use a mapping functionality to associated various identifiers to an MTC related device and a related HSS 110 and/or MME 112.

In some embodiments, SCEF 120 and LM 122 may be co-located. For example, SCEF 120 and LM 122 may be implemented on a same computing platform or device.

In some embodiments, SCEF 120 and LM 122 may be distinct and separate entities. For example, SCEF 120 and LM 122 may be implemented on separate computing platforms.

In some embodiments, SCEF 120 and/or LM 122 may include a Diameter signaling router, a Diameter routing agent, or similar functionality. For example, a Diameter signaling router may be any suitable entity or entities for routing, forwarding, relaying Diameter or other messages to network nodes in communications environment 100. In this example, the Diameter signaling router may interact with SCS 106 and HSS 110 via various MTC related interfaces, such as S6m, S6t, Tsp, etc.

In some embodiments, SCEF 120 and LM 122 may include or access data storage 124. Data storage 124 may represent any suitable entity or entities (e.g., non-transitory computer readable media, flash memory, random access memory, and/or a storage device) for storing information related to MTC communications and MTC related devices. For example, data storage 124 may store session data for various UE devices and/or related nodes, e.g., a list of relevant serving network nodes for communicating with a UE device 102 and mappings of external UE identifiers and/or internal UE identifiers.

SCS 106 may represent any suitable entity or entities (e.g., software executing on at least one processor) for performing one or more aspects associated with providing access to services. For example, SCS 106 may include functionality for providing access to one or more service components over standardized communications interfaces (e.g., application programming interfaces). In some embodiments, SCS 106 may also host one or more service components. SCS 106 may also send communications, e.g., device trigger requests, destined for UE device 102 for triggering various actions.

MTC data communications between a UE device and an MTC application server may be established and handled similar to other client and server communications over the EPC network. For example, dedicated session bearers may be established using SGW 108 and PGW 114. In addition, SCEF 120 and/or LM 122 and SCS 106 may also be utilized to establish a bearer connection between UE device 102 and MTC application server 116.

MTC application server 116 may be any computing device that hosts an MTC service and may communicate with a plurality of UE devices (e.g., UE device 102) and with other network nodes, e.g., HSS 110 and MME(s) 112. In some embodiments, MTC application server 116 may send various message (e.g., a device wakeup message) via data tunnels traversing SCEF 120, LM 122, and/or SCS 106.

In some embodiments, an MTC related message may include an MTC identity that identifies UE device 102. In some embodiments, the MTC identity is an identifier that a service operator assigns to a UE device and is provided to MTC application server 116. An MTC identity may remain assigned to a given UE device throughout its subscription validation for the network. In some embodiments, an MTC identity may refer to a subscribed identity for UE device 102. SCEF 120, LM 122, and/or SCS 106 may include one or more mapping tables that include entries that map MTC identities/identifiers to MTC paging identifiers (e.g., temporary UE identifiers or SCEF reference identifiers). In some embodiments. SCEF 120 or a related entity (e.g., LM 122) may forward the device trigger message to UE device 102 using an MTC paging identifier that corresponds to an MTC identity.

In some embodiments, SCEF 120 and/or LM 122 may be configured to facilitate MTC monitoring event procedures. For example, SCEF 120 and/or LM 122 may be utilized in an MTC Monitoring event procedure for monitoring MTC device related information (e.g., location information, UE reachability information, roaming status information, and/or other information) using a T8 interface specified in TS 29.122. In this example, SCS 106 or MTC application server 116 may send a monitoring configuration request (e.g., a subscription request) to SCEF 120 via the T8 interface, where the request is for monitoring device related information. Continuing with this example, SCEF 120 may create a monitoring context and may facilitate obtaining and providing requested device related information to SCS 106 or MTC application server 116 via various MTC related interfaces (e.g., a S6m interface, a S6t interface, a T6a interface, a T6b interface, a T6ai interface, a T6bi interface, etc.).

In some embodiments, SCEF 120 and/or LM 122 may be configured to request and obtain MTC device related information from one or more network nodes without using one or more unsupported MTC related interfaces. In such embodiments, SCEF 120 and/or LM 122 may utilize other supported interfaces (e.g., Diameter SLh, S6a, and/or S6d interfaces) to request and obtain device related information from one or more network nodes either one-time or repeatedly. For example, SCEF 120 and/or LM 122 may be configured for receiving a monitoring configuration request associated with a MTC device; sending, to HSS 110 via a SLh interface, a send routing information request for requesting a serving network node (e.g., SGW 108 or MME 112) associated with the MTC device; receiving, from HSS 110, an send routing information response indicating the serving network node associated with the MTC device; sending, to the serving network node, an insert subscriber data request for requesting device related information; and receiving, from the serving network node, an insert subscriber data response including the device related information.

It will be appreciated that FIG. 1 and its related description are for illustrative purposes and that each of nodes and entities described above may include additional and/or different modules, components, or functionality. Further, SCEF 120, LM 122, SCS 106, and/or related functionality described herein may be associated with different and/or additional nodes or entities.

Figure 2:
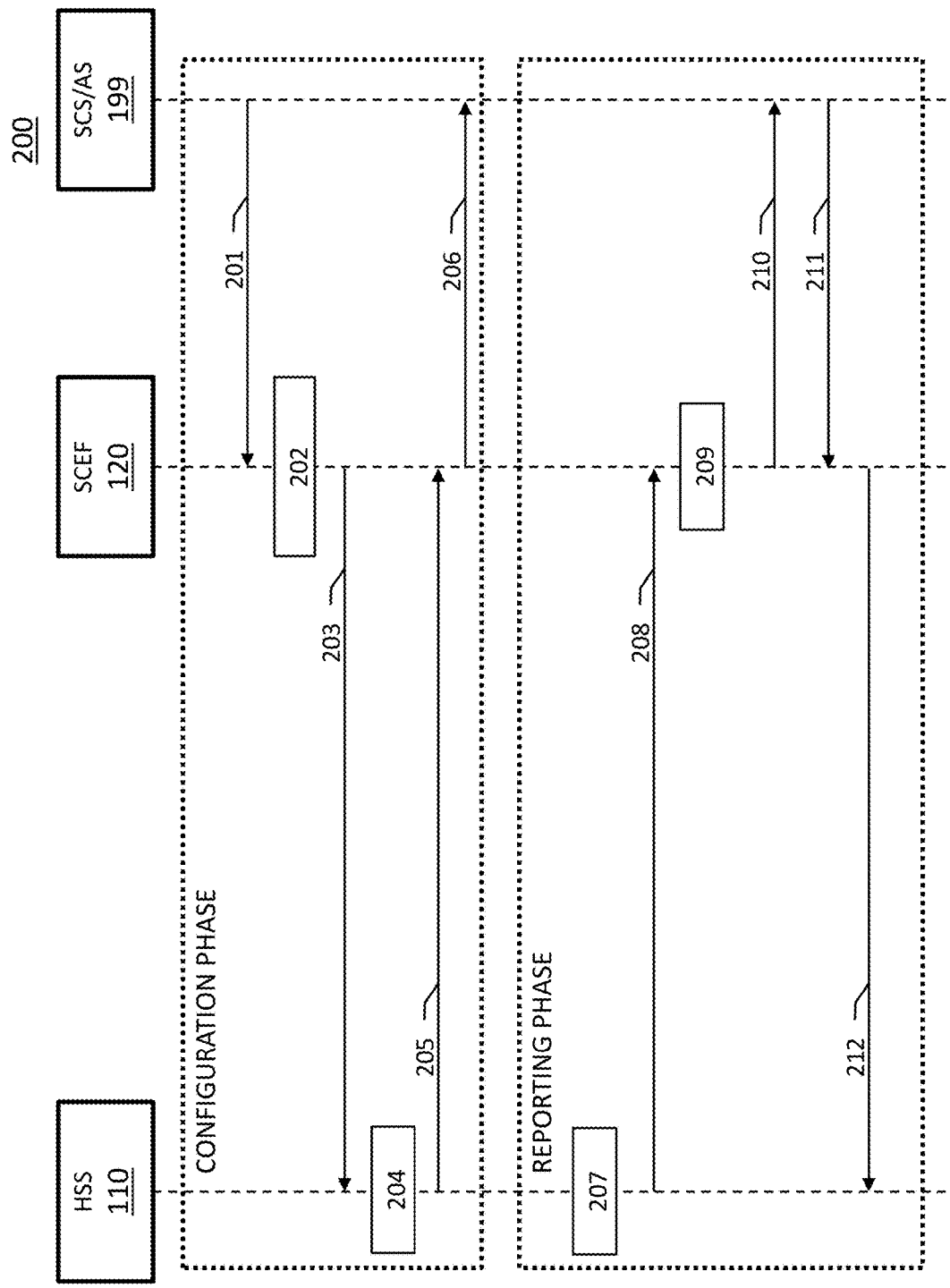
FIG. 2 is a message flow diagram illustrating an example process associated with an MTC monitoring event procedure.

FIG. 2 is a message flow diagram illustrating an example process 200 associated with an MTC monitoring event procedure. Referring to FIG. 2, process 200 may involve an SCS 106 and/or MTC application server 116 depicted in FIG. 2 as SCS/AS 199. For example, process 200 may allow SCS/AS 199 to obtain, via a T8 interface, device related information regarding UE device 102 from HSS 110.

In some embodiments, process 200 may be associated with a configuration phase (e.g., steps 201-206) for config-uring a monitoring event or subscription and a reporting phase (e.g., steps 207-212) for providing device related information associated with the monitoring event or subscription.

Referring to FIG. 2, in step 201, SCS/AS 199 may send, to SCEF 120, a monitoring event request (e.g., a subscription request) indicating a request for device related information, e.g., location information, UE reachability, device status information, etc. For example, the monitoring event request may be sent via a T8 interface between SCS/AS 199 and SCEF 120.

In step 202, SCEF 120 may validate the monitoring event request and/or a related entity and, once validated, may generate a Diameter based configuration-information-request (CIR) message containing configuration information associated with the monitoring event and a unique SCEF reference identifier indicating UE device 102 or a related entity.

In step 203, SCEF 120 may send the CIR message to HSS 110 via a S6t interface.

In step 204, HSS 110 may validate the CIR message and/or a related entity and, once validated, may generate a Diameter based configuration-information-answer (CIA) message containing a success cause code or indicator and, if available, a report containing requested device related information.

In step 205, HSS 110 may send the CIA message to SCEF 120 via the S6t interface.

In step 206, SCEF 120 may send, to SCS/AS 199, an HTTP response message (e.g., HTTP response 201 code message) indicating that the monitoring event or subscription was created successfully.

In step 207, e.g., when requested device related information is available, HSS 110 may generate a Diameter based reporting-information-request (RIR) message containing requested device related information.

In step 208, HSS 110 may send, to SCEF 120, the RIR message via the S6t interface.

In step 209, SCEF 120 may determine whether the RIR message is expired and, if not expired, SCEF 120 may generate a monitoring status notification message containing the requested device related information.

In step 210, SCEF 120 may send, to SCS/AS 199, the monitoring status notification message via the T8 interface.

In step 211, SCS/AS 199 may send, to SCEF 120 via the T8 interface, a response message indicating successful receipt of the monitoring status notification message.

In step 212, SCEF 120 may send, to HSS 110 via the S6t interface, a Diameter based reporting-information-answer (RIA) message indicating successful receipt of the RIR message.

It will be appreciated that process 200 in FIG. 2 is for illustrative purposes and that different and/or additional messages and/or actions may be used. It will also be appreciated that various messages and/or actions described herein with regard to process 200 may occur in a different order or sequence.

Figure 3:
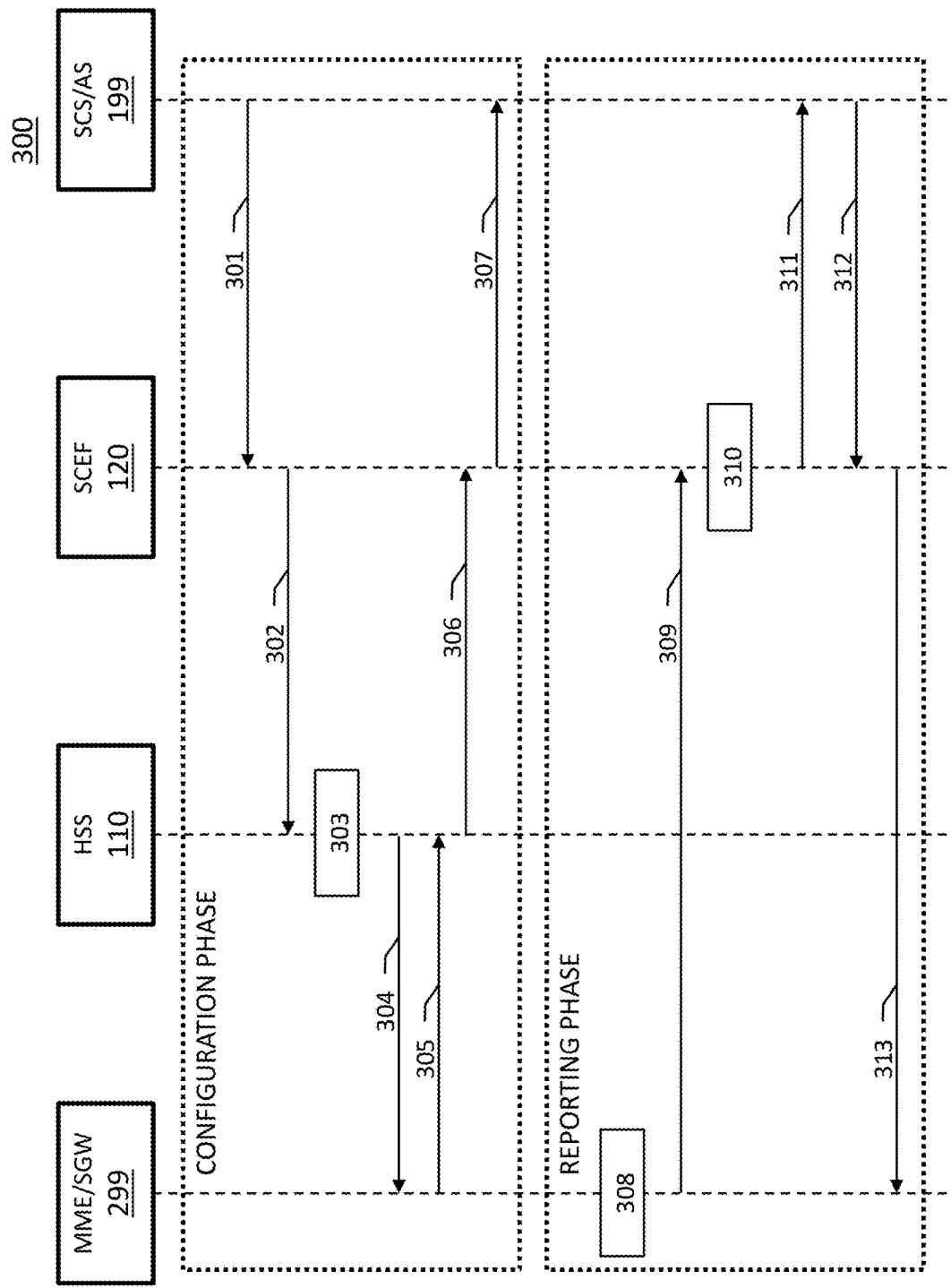
FIG. 3 is a message flow diagram illustrating another example process associated with an MTC monitoring event procedure.

FIG. 3 is a message flow diagram illustrating another example process 300 associated with an MTC monitoring event procedure. Referring to FIG. 3, process 300 may involve MME 118 or SGW 108 depicted in FIG. 3 as MME/SGW 299. For example, process 300 may allow SCS/AS 199 to obtain, via a T8 interface, device related information regarding UE device 102 from MME/SGW 299, e.g., when HSS 110 does not have the requested information.

In some embodiments, process 300 may be associated with a configuration phase (e.g., steps 301-307) for config-uring a monitoring event or subscription and a reporting phase (e.g., steps 308-312) for providing device related information associated with the monitoring event or subscription.

Referring to FIG. 3, in step 301, SCS/AS 199 may send, to SCEF 120, a monitoring event request (e.g., a subscription request) indicating a request for device related information, e.g., location information, UE reachability, device status information, etc. For example, the monitoring event request may be sent via a T8 interface between SCS/AS 199 and SCEF 120.

In step 302, SCEF 120 may validate the monitoring event request and/or a related entity and, once validated, may generate and send, to HSS 110 via a S6t interface, a Diameter based CIR message containing configuration information associated with the monitoring event and a unique SCEF reference identifier indicating UE device 102 or a related entity.

In step 303, HSS 110 may validate the CIR message and/or a related entity and, once validated, may generate a Diameter based insert-subscriber-data-request (IDR) message for requesting device related information associated with the monitoring event. In some embodiments, the IDR message may contain, if available, a report containing requested device related information available at HSS 110.

In step 304, HSS 110 may send the IDR message to one or more serving network nodes, e.g., MME/SGW 299 via an S6a or S6d (S6a/d) interface.

In step 305, MME/SGW 299 may generate and send a Diameter based insert-subscriber-data-answer (IDA) message to HSS 110 via the S6 interface. The IDA message may contain a success cause code or indicator and, if available, a report containing requested device related information.

In step 306, HSS 110 may validate the IDA message and/or a related entity and, once validated, may generate and send a Diameter based CIA message to SCEF 120 via the S6t interface. The CIA message may contain a success cause code or indicator and, if available, a report containing requested device related information.

In step 307, SCEF 120 may send, to SCS/AS 199, an HTTP response message (e.g., HTTP response 201 code message) indicating that the monitoring event or subscription was created successfully.

In step 308, e.g., when requested device related information is available, MME/SGW 299 may generate a Diameter based RIR message containing requested device related information.

In step 309, MME/SGW 299 may send, to SCEF 120, the RIR message via a T6a or T6b interface.

In step 310, SCEF 120 may determine whether the RIR message is expired and, if not expired, SCEF 120 may generate a monitoring status notification message containing the requested device related information.

In step 311, SCEF 120 may send, to SCS/AS 199, the monitoring status notification message via the T8 interface.

In step 312, SCS/AS 199 may send, to SCEF 120 via the T8 interface, a response message indicating successful receipt of the monitoring status notification message.

In step 313, SCEF 120 may send, to MME/SGW 299 via the T6 interface, a Diameter based RIA message indicating successful receipt of the RIR message.

It will be appreciated that process 300 in FIG. 3 is for illustrative purposes and that different and/or additional messages and/or actions may be used. It will also be appreciated that various messages and/or actions described herein with regard to process 300 may occur in a different order or sequence.

FIGS. 4A and 4B depict example location reporting monitoring event information and example mapping information. Referring to FIG. 4A, data structure 400 may represent one or more data structures for storing location monitoring related information usable for requesting location information. In some embodiments, data structure 400 or related data may be accessible to SCEF 120 or LM 122. For example, data structure 400 or related data may be stored in data storage 124.

Data structure 400 may indicate parameters and/or related values for a T8 interface based monitoring event request. For example, a T8 interface based monitoring event request may utilize a representational state transfer (REST) API and may be a HTTP request message. In this example, the T8 interface based monitoring event request may include a T8 monitoring type parameter value of 'LOCATION_REPORTING' and may include a request type value or other information. In some embodiments, a request type value or other information may indicate the location reporting request is a one-time request or a continuous request (e.g., a location is requested to be provided periodically or when a change occurs). In some embodiments, a request type value or other information may indicate that a last known location is requested or a current location and last known location if a current location is unknown.

Data structure 400 may indicate parameters and/or related values for a Diameter interface based monitoring event request. For example, a Diameter interface based monitoring event request may utilize an S6t interface and may be a CIR message. In this example, the Diameter interface based monitoring event request may include a Diameter "monitoring-type" parameter value of 'LOCATION_REPORTING' and may include a request type value or other information. In some embodiments, a request type value or other information may indicate the location reporting request is a one-time request or a continuous request (e.g., a location is requested to be provided periodically or when a change occurs). In some embodiments, a request type value or other information may indicate that a last known location is requested or a current location and last known location if a current location is unknown.

It will be appreciated that data in data structure 400 depicted in FIG. 4A is illustrative and that different and/or additional data may be used in monitoring MTC device related information, e.g., device location information, UE reachability information, roaming status information, and/or device status information.

Referring to FIG. 4B, data structure 402 may represent one or more data structures for storing information related to serving network nodes associated with UE identifiers. In some embodiments, data structure 402 or related data may be accessible to SCEF 120 or LM 122. For example, data structure 402 or related data may be stored in data storage 124. In some embodiments, data structure 402 or related data may be obtained or derived from information provided by various nodes, e.g., UE device 102, SCS 106, HSS 110, and/or MME(s) 112. In some embodiments, each row represents an association between an external identifier (e.g., 'username163@realm4') and/or an mobile station international subscriber directory number (MSISDN) (e.g., '381492895256378') associated with a UE device and an internal identifier (e.g., an IMSI, such as '16481234567') associated with a UE device. In some embodiments, UE identifiers may be received from SCS 106, e.g., in device trigger requests or other messages and/or UE identifiers may be received from other nodes.

In some embodiments, each row may indicate one or more serving network nodes for a related UE device. For example, data structure 402 may store a number of identifiers serving network nodes (e.g., MMEs, HSSs, SGWs, or other network nodes) for communicating with a UE device. In some embodiments, serving network nodes or related identifiers may be received from SCS 106, e.g., in device trigger requests or other messages and/or UE identifiers may be received from other nodes.

In some embodiments, an external identifier and/or an MSISDN may represent a UE identifier for indicating a UE device. For example, an external identifier and/or an MSISDN may be used as an identifier for various network nodes (e.g., HSS 110 or MME(s) 112) or other entities to communicate with or about a UE device (e.g., UE device 102). In some embodiments, an external identifier and/or an MSISDN may be provided by a UE device or a related node (e.g., SCS 106).

In some embodiments, an internal identifier may represent a UE identifier for indicating a UE device. For example, an internal identifier may be an IMSI and may be used as a charging identifier. In some embodiments, an external identifier may be preferred over an internal identifier, especially when involving nodes outside of a home network. In some embodiments, an internal identifier may be provided by a UE device or a network node (e.g., HSS 110 or SCEF 120).

It will be appreciated that data in data structure 402 depicted in FIG. 4B is illustrative and that different and/or additional data may be used in monitoring MTC device related information, e.g., device location information, UE reachability information; roaming status information; and/or device status information.

Figure 5:
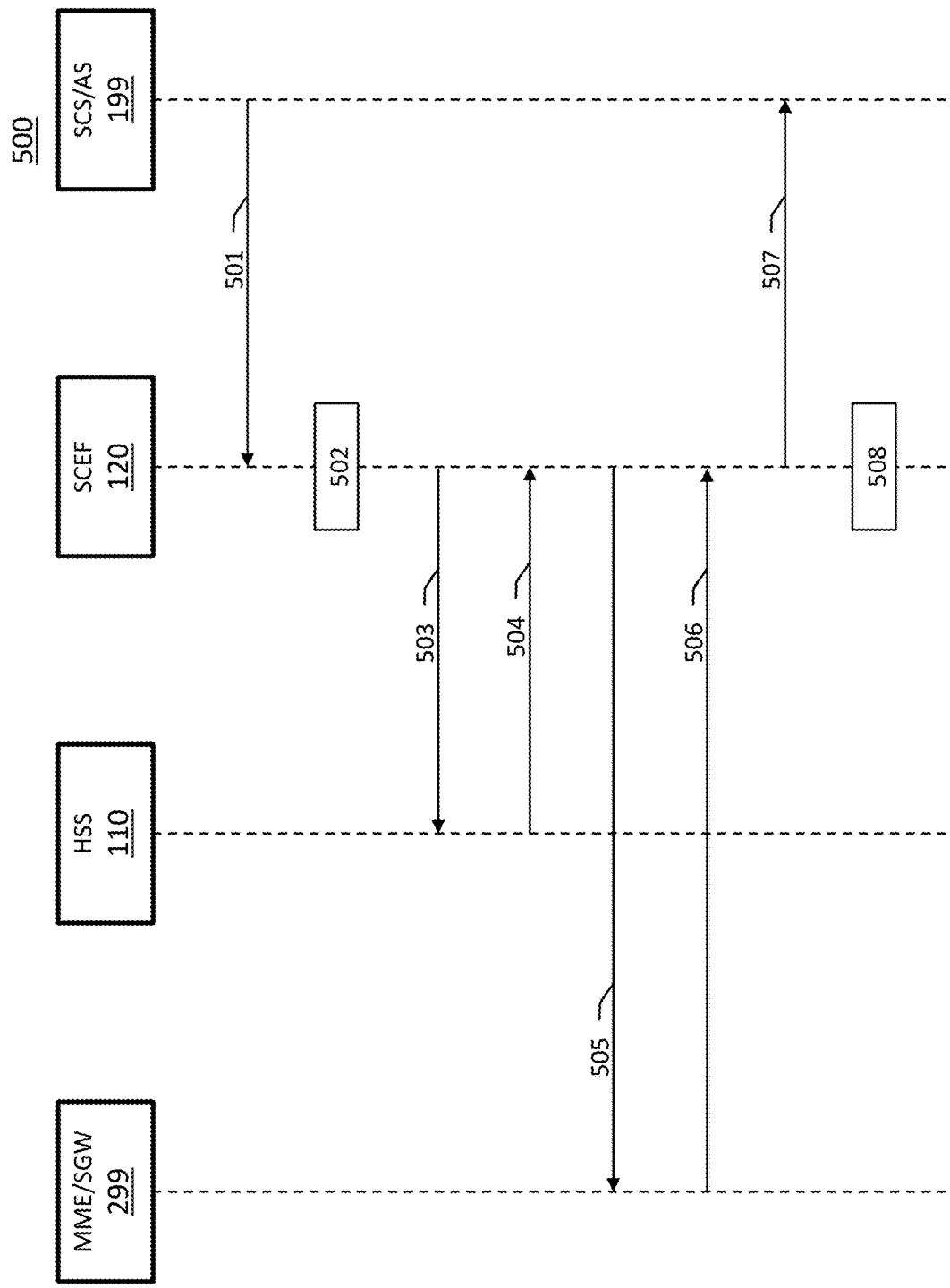
FIG. 5 is a message flow diagram illustrating an example process related to obtaining MTC device related information.

FIG. 5 is a message flow diagram illustrating an example process 500 related to obtaining MTC device related information. In some embodiments, process 500 may be utilized for requesting and obtaining MTC device information (e.g., device location information) when SGW 108, HSS 110, and/or MME(s) 112 do not support one or more MTC related interfaces (e.g., a S6m interface; a S6t interface, a T6a interface, a T6b interface, a T6ai interface, or a T6bi interface). For example, process 500 may allow SCS/AS 199 to obtain, via a T8 interface; device related information regarding UE device 102 by communicating with serving network nodes using Diameter interfaces (e.g., SL and S6 interfaces) that are implemented or supported by serving network nodes, e.g., MME/SGW 299.

Referring to FIG. 5, in step 501, SCS/AS 199 may send, to SCEF 120, a monitoring event request (e.g., a subscription request) indicating a one-time request for device related information (e.g., location information, UE reachability, device status information, etc.) associated with UE device 102. For example, the monitoring event request may be an HTTP request sent via a T8 interface between SCS/AS 199 and SCEF 120. In this example, the HTTP request may indicate a monitoring type of 'Location_Reporting' and a one-time request.

In step 502, SCEF 120 may validate the monitoring event request and/or a related entity and, once validated, SCEF 120 may create a monitoring context (e.g., a data tuple) representing the requested monitoring event. For example, a monitoring context may associate a monitoring event or subscription and one or more MTC related identifiers (e.g., an device identifier or a reference identifier and an IMSI) stored in data structure 402.

In step 503, SCEF 120 may generate and send, to HSS 110 via a SLh interface, a Diameter based send routing information (SRI) request for requesting a serving network node associated with UE device 102. For example, SCEF 120 may send a SRI for location service (SRI-LCS) request message to HSS 110 via an SLh interface. In this example, the SRI-LCS request message may include an IMSI and/or another identifier for identifying UE device 102.

In step 504, HSS 110 may validate the SRI request and/or a related entity and, once validated, may generate and send a SRI response message (e.g., a SRI-LCS response message) to SCEF 120 via the SLh interface. The SRI response message may contain serving network node information, e.g., address information for communicating with a last known MME/SGW 299 serving UE device 102.

In step 505, SCEF 120 may generate and send, to MME/SGW 299 via an S6a/d interface, a Diameter based IDR message for requesting device related information associated with the monitoring event.

In step 506, MME/SGW 299 may generate and send a Diameter based IDA message to SCEF 120 via the S6a/d interface. The IDA message may contain requested device related information, e.g., a last known location associated with UE device 102.

In step 507, SCEF 120 may send, to SCS/AS 199, an HTTP response message containing or indicating the device related information.

In step 508, SCEF 120 may delete the monitoring context associated with the monitoring event.

It will be appreciated that process 500 in FIG. 5 is for illustrative purposes and that different and/or additional messages and/or actions may be used for requesting and obtaining MTC device related information. It will also be appreciated that various messages and/or actions described herein with regard to process 500 may occur in a different order or sequence.

Figure 6:
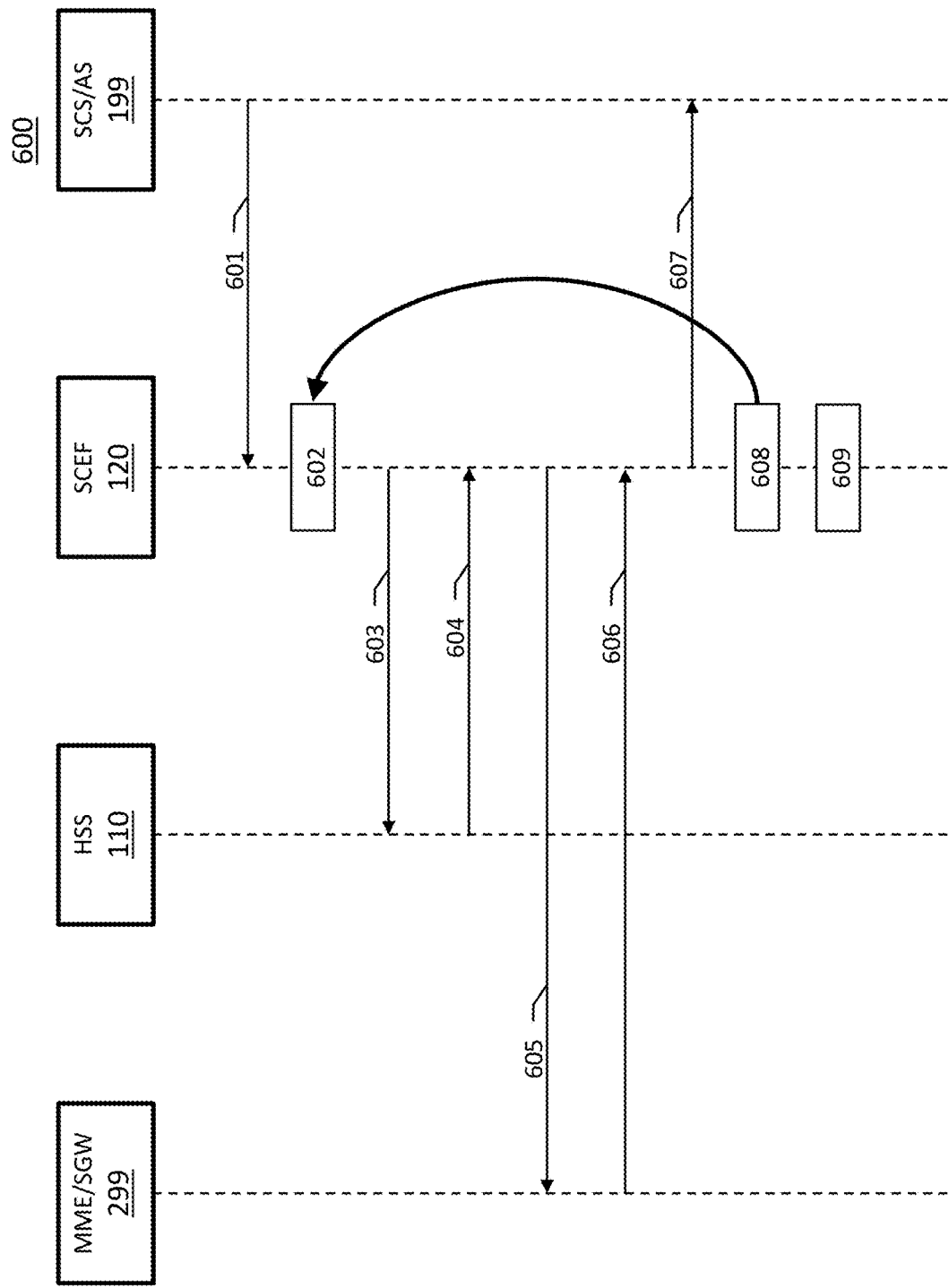
FIG. 6 is a message flow diagram illustrating an example process related to continuously monitoring MTC device related information.

FIG. 6 is a message flow diagram illustrating an example process 600 related to continuously monitoring MTC device related information. In some embodiments, process 600 may be utilized for continuously (e.g., repeatedly) requesting and obtaining MTC device information (e.g., device location information) when SGW 108, HSS 110, and/or MME(s) 112 do not support one or more MTC related interfaces (e.g., a S6m interface, a S6t interface, a T6a interface, a T6b interface, a T6ai interface, or a T6bi interface). For example, process 600 may allow SCS/AS 199 to obtain, via a T8 interface, device related information regarding UE device 102 by communicating with serving network nodes using Diameter interfaces (e.g., SLh and S6a/d interfaces) that are implemented or supported by serving network nodes, e.g., MME/SGW 299.

In some embodiments. SCEF 120 or a related entity (e.g., LM 122) may utilize timers associated with a monitoring event or subscription to repeatedly (e.g., continually or periodically) request and obtain device related information. For example, concurrently when SCEF 120 sends a SRI request and an IDR message, an interval timer may be set or restarted for allowing a maximum amount of time for SCEF 120 to obtain device related information from serving network nodes, e.g., HSS 110 or MME/SGW 299. In this example, when the interval timer expires without SCEF 120 receives device related information or in response to another trigger event, SCEF 120 may be configured to try again to obtain device related information.

Referring to FIG. 6, in step 601, SCS/AS 199 may send, to SCEF 120, a monitoring event request (e.g., a subscription request) indicating a continuous request for device related information (e.g., location information, UE reachability, device status information, etc.) associated with UE device 102. For example, the monitoring event request may be an HTTP request sent via a T8 interface between SCS/AS 199 and SCEF 120. In this example, the HTTP request may indicate a monitoring type of 'Location_Reporting' and a continuous request (e.g., until a request or subscription is canceled or a predetermined amount of time is reached).

In step 602, SCEF 120 may validate the monitoring event request and/or a related entity and, once validated, SCEF 120 may create a monitoring context (e.g., a data tuple) representing the requested monitoring event. For example, a monitoring context may associate a monitoring event or subscription and one or more MTC related identifiers (e.g., an device identifier and an IMSI) stored in data structure 402. In this example, SCEF 120 or a related entity (e.g., LM 122) may also set up or configure various timers or related logic associated with the monitoring context.

In step 603, SCEF 120 may generate and send, to HSS 110 via a SLh interface, a Diameter based SRI request for requesting a serving network node associated with UE device 102. For example, SCEF 120 may send a SRI-LCS request message to HSS 110 via an SLh interface, where the SRI-LCS request message may include an IMSI and/or another identifier for identifying UE device 102.

In step 604, HSS 110 may validate the SRI request and/or a related entity and, once validated, may generate and send a SRI response message (e.g., a SRI-LCS response message) to SCEF 120 via the SLh interface. The SRI response message may contain serving network node information, e.g., address information for communicating with a current or last known MME/SGW 299 serving UE device 102.

In step 605, SCEF 120 may generate and send, to MME/SGW 299 via an S6a/d interface, a Diameter based IDR message for requesting current or last known device related information associated with the monitoring event.

In step 606, MME/SGW 299 may generate and send a Diameter based IDA message to SCEF 120 via the S6a/d interface. The IDA message may contain requested device related information, e.g., a current or last attach time associated with UE device 102.

In step 607, SCEF 120 may send, to SCS/AS 199, an HTTP response message containing or indicating the device related information.

In step 608, after an interval timer expires or another trigger event, SCEF 120 may request device related information again (e.g., repeat steps 603-607).

In step 609, once the monitoring context expires, SCEF 120 may delete the monitoring context (and may clear or remove context data or related timers) associated with the monitoring event.

It will be appreciated that process 600 in FIG. 6 is for illustrative purposes and that different and/or additional messages and/or actions may be used for requesting and obtaining MTC device related information. It will also be appreciated that various messages and/or actions described herein with regard to process 600 may occur in a different order or sequence.

Figure 7:
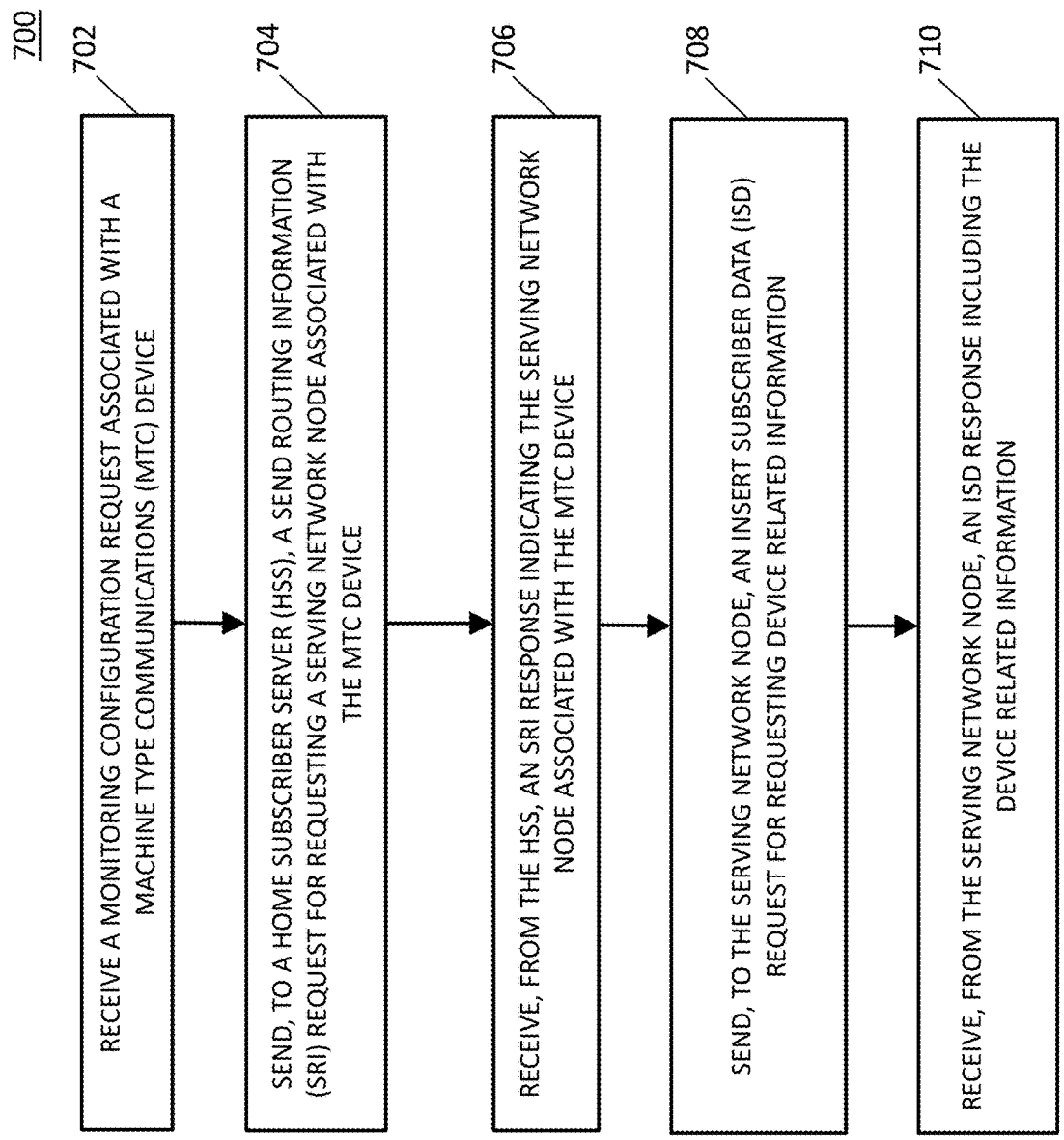
FIG. 7 depicts an example method for monitoring MTC device related information.

FIG. 7 depicts an example method 700 for monitoring MTC device related information. In some embodiments, example method 700 described herein, or portions thereof, may be performed at or performed by a gateway device (e.g., at least one computing platform comprising one or more processors), a Diameter routing agent, SCEF 120, LM 122, and/or another module or node. For example, method 700 may be an algorithm that is stored in memory and executed by at least one processor within one or more of these aforementioned network components. In some embodiments, method 700 may include steps 702, 704, 706, 708, and/or 710.

In step 702, a monitoring configuration request associated with an MTC device may be received. For example, SCEF 120 or a gateway device may receive from SCS 106, MTC application server 116, or SCS/AS 199 via a T8 interface, a monitoring configuration request (e.g., a monitoring event or subscription request) for requesting a current or last known location of UE device 102.

In some embodiments, a monitoring configuration request may be an HTTP request message from SCS 106 or MTC application server 116. In some embodiments, a monitoring configuration request may be a one-time request or may be for continuous monitoring. For example, SCEF 120 or a gateway device may utilize one or more timers to periodically request location information from MME 112, SGW 108, or another entity.

In step 704, an SRI request for requesting a serving network node associated with the MTC device may be sent to an HSS. For example, SCEF 120 or a gateway device may send, via an SLh interface, a SRI request to HSS 110 for requesting a particular MME 112 handling UE device 102.

In some embodiments, an SRI request may include an IMSI associated with the MTC device. For example, prior to generating an SRI message or another message associated with UE device 102, SCEF 120 or a gateway device may consult, using a device identifier, data structure 402 or related information to determine a related IMSI for indicating UE device 102.

In step 706, an SRI response indicating the serving network node associated with the MTC device may be received from the HSS. For example, SCEF 120 or a gateway device may receive, via an SLh interface, a SRI response from HSS 110, where the SRI response may address information (e.g., URI) indicating MME 112 that handles mobility management for UE device 102. In this example, SCEF 120 or a gateway device may store the address information in data structure 402 for future usage.

In some embodiments, the SRI request or the SRI response may be sent or received via an SLh, SLg, Lg interface. For example, an SLh interface may be used for sending SRI requests to HSS 110, an SLg interface may be used for sending SRI requests to MME 112, and an Lg interface may be used for sending SRI requests to an SGSN, e.g., SGW 108.

In step 708, an ISD request for requesting device related information may sent to the serving network node. For example, SCEF 120 or a gateway device may send, via an SLh interface, a SRI request to HSS 110 for requesting a particular MME 112 handling UE device 102.

In step 710, an ISD response including the device related information may be received from the serving network node.

In some embodiments, an ISD request or an ISD response may be sent or received via an S6a/d interface.

In some embodiments, a serving network node may be MME 112 or an SGSN (e.g., SGW 108).

In some embodiments, method 700 may include sending, to SCS 106, MTC application server 116, or SCS/AS 199, the device related information. For example, device related information may include device location information, UE reachability information, roaming status information, and/or device status information.

In some embodiments, an MTC device may be a UE device, an M2M device, or an IoT device.

In some embodiments, an SCEF node for performing method 700 may include a gateway device, a Diameter routing agent, or an MTC-IWF.

It will be appreciated that method 700 is for illustrative purposes and that different and/or additional actions may be used. It will also be appreciated that various actions described herein with regard to method 700 may occur in a different order or sequence.

It should be noted that each of SCEF 120, LM 122, and/or functionality described herein may constitute a special purpose computing device. Further, SCEF 120, LM 122, HSS 110 and/or functionality described herein can improve the technological field of network communications involving MTC devices (e.g., UE devices, M2M devices, IoT devices, etc.) by utilizing various techniques or mechanisms for obtaining device related information from network nodes. For example, the disclosed subject matter affords the technical advantage of providing techniques or mechanisms for obtaining MTC device related information when serving network nodes do not support one or more MTC related interfaces, e.g., by instead using existing Diameter related interfaces, e.g., S6 and SL interfaces.

It will be understood that various details of the subject matter described herein may be changed without departing from the scope of the subject matter described herein. Furthermore, the foregoing description is for the purpose of illustration only, and not for the purpose of limitation.

What is claimed is:

1. A method comprising:
at a service capability exposure function (SCEF) node:
receiving a monitoring configuration request associated with a machine type communications (MTC) device;
sending, to a home subscriber server (HSS), a send routing information (SRI) request for requesting a serving network node associated with the MTC device;
receiving, from the HSS, an SRI response indicating the serving network node associated with the MTC device, wherein the SRI request or the SRI response is sent or received via an SLh, SLg, or Lg interface;
sending, to the serving network node, an insert subscriber data (ISD) request for requesting device related information; and
receiving, from the serving network node, an ISD response including the device related information.

2. The method of claim 1 comprising:
sending, to an MTC application server or a service capability server, the device related information.

3. The method of claim 1 wherein the device related information includes device location information, UE reachability information, roaming status information, or device status information.

4. The method of claim 1 wherein the monitoring configuration request is received from an MTC application server or service capability server and wherein the monitoring configuration request is an hypertext transfer protocol (HTTP) message.

5. The method of claim 1 wherein the SRI request includes an international mobile subscriber identity (IMSI) associated with the MTC device.

6. The method of claim 1 wherein the MTC device is a user equipment (UE) device, a machine-to-machine (M2M) device, or an internet of things (IoT) device.

7. A method comprising:
at a service capability exposure function (SCEF) node:
receiving a monitoring configuration request associated with a machine type communications (MTC) device;
sending, to a home subscriber server (HSS), a send routing information (SRI) request for requesting a serving network node associated with the MTC device;
receiving, from the HSS, an SRI response indicating the serving network node associated with the MTC device;
sending, to the serving network node, an insert subscriber data (ISD) request for requesting device related information; and
receiving, from the serving network node, an ISD response including the device related information, wherein the ISD request or the ISD response is sent or received via an S6a or S6d interface and wherein the serving network node is a mobility management entity (MME) or a serving general packet radio services (GPRS) support node (SGSN).

8. A method comprising:
at a service capability exposure function (SCEF) node:
receiving a monitoring configuration request associated with a machine type communications (MTC) device;
sending, to a home subscriber server (HSS), a send routing information (SRI) request for requesting a serving network node associated with the MTC device;
receiving, from the HSS, an SRI response indicating the serving network node associated with the MTC device;
sending, to the serving network node, an insert subscriber data (ISD) request for requesting device related information; and
receiving, from the serving network node, an ISD response including the device related information, wherein the monitoring configuration request is for continuous monitoring and wherein the SCEF utilizes one or more timers to perform the continuous monitoring.

9. A system comprising:
a service capability exposure function (SCEF) node comprising at least one processor, the SCEF node configured for:
receiving a monitoring configuration request associated with a machine type communications (MTC) device;
sending, to a home subscriber server (HSS), a send routing information (SRI) request for requesting a serving network node associated with the MTC device;
receiving, from the HSS, an SRI response indicating the serving network node associated with the MTC device, wherein the SRI request or the SRI response is sent or received via an SLh, SLq, or Lq interface;
sending, to the serving network node, an insert subscriber data (ISD) request for requesting device related information; and
receiving, from the serving network node, an ISD response including the device related information.

10. The system of claim 9 wherein the SCEF node is configured for:
sending, to an MTC application server or a service capability server, the device related information.

11. The system of claim 9 wherein the device related information includes device location information, UE reachability information, roaming status information, or device status information.

12. The system of claim 9 wherein the monitoring configuration request is received from an MTC application server or service capability server and wherein the monitoring configuration request is an hypertext transfer protocol (HTTP) message.

13. The system of claim 9 wherein the SRI request includes an international mobile subscriber identity (IMSI) associated with the MTC device.

14. The system of claim 9 wherein the MTC device is a user equipment (UE) device, a machine-to-machine (M2M) device, or an internet of things (IoT) device.

15. A system comprising:
a service capability exposure function (SCEF) node comprising at least one processor, the SCEF node configured for:
receiving a monitoring configuration request associated with a machine type communications (MTC) device;
sending, to a home subscriber server (HSS), a send routing information (SRI) request for requesting a serving network node associated with the MTC device;
receiving, from the HSS, an SRI response indicating the serving network node associated with the MTC device;
sending, to the serving network node, an insert subscriber data (ISD) request for requesting device related information; and
receiving, from the serving network node, an ISD response including the device related information, wherein the ISD request or the ISD response is sent or received via an S6a or S6d interface and wherein the serving network node is a mobility management entity (MME) or a serving general packet radio services (GPRS) support node (SGSN).

16. A system comprising:
a service capability exposure function (SCEF) node comprising at least one processor, the SCEF node configured for:
receiving a monitoring configuration request associated with a machine type communications (MTC) device;
sending, to a home subscriber server (HSS), a send routing information (SRI) request for requesting a serving network node associated with the MTC device;
receiving, from the HSS, an SRI response indicating the serving network node associated with the MTC device;
sending, to the serving network node, an insert subscriber data (ISD) request for requesting device related information; and
receiving, from the serving network node, an ISD response including the device related information, wherein the monitoring configuration request is for continuous monitoring and wherein the SCEF utilizes one or more timers to perform the continuous monitoring.

17. A non-transitory computer readable medium comprising computer executable instructions embodied in the non-transitory computer readable medium that when executed by at least one processor of at least one computer cause the at least one computer to perform steps comprising:
at a service capability exposure function (SCEF) node:
receiving a monitoring configuration request associated with a machine type communications (MTC) device;
sending, to a home subscriber server (HSS), a send routing information (SRI) request for requesting a serving network node associated with the MTC device;
receiving, from the HSS, an SRI response indicating the serving network node associated with the MTC device, wherein the SRI request or the SRI response is sent or received via an SLh, SLq, or Lg interface;
sending, to the serving network node, an insert subscriber data (ISD) request for requesting device related information; and
receiving, from the serving network node, an ISD response including the device related information.

18. The non-transitory computer readable medium of claim 17 comprising:
sending, to an MTC application server or a service capability server, the device related information.

* * * * *

UNITED STATES PATENT AND TRADEMARK OFFICE
CERTIFICATE OF CORRECTION

PATENT NO. : 11,381,955 B2
APPLICATION NO. : 16/932226
DATED : July 5, 2022
INVENTOR(S) : Aravind et al.

It is certified that error appears in the above-identified patent and that said Letters Patent is hereby corrected as shown below:

On the Title Page

On page 3, Column 1, under References Cited, Line 18, below "2020/0037203 A1 1/2020 Ianev et al." insert -- 2020/0037226 A1 1/2020 Magadevan --, therefor.

On page 4, Column 2, under Other Publications, Line 53, delete "Applicatons" and insert -- Applications --, therefor.

On page 6, Column 1, under Other Publications, Line 36, delete "Numbers" and insert -- Numbers: --, therefor.

In the Specification

In Column 7, Line 10, delete "embodiments." and insert -- embodiments, --, therefor.

In Column 11, Line 31, delete "information;" and insert -- information, --, therefor.

In Column 11, Line 31, delete "information;" and insert -- information, --, therefor.

In Column 11, Line 39, delete "interface;" and insert -- interface, --, therefor.

In Column 11, Line 42, delete "interface;" and insert -- interface, --, therefor.

In Column 12, Line 49, delete "embodiments." and insert -- embodiments, --, therefor.

In the Claims

In Column 16, Line 49, in Claim 9, delete "SLq, or Lq" and insert -- SLg, or Lg --, therefor.

In Column 18, Line 28, in Claim 17, delete "SLq," and insert -- SLg, --, therefor.

Signed and Sealed this
Twentieth Day of December, 2022

*Katherine Kelly Vidal*

Katherine Kelly Vidal
*Director of the United States Patent and Trademark Office*